(12) United States Patent
Kapoor et al.

(10) Patent No.: US 7,023,938 B1
(45) Date of Patent: Apr. 4, 2006

(54) RECEIVER FOR DISCRETE MULTITONE MODULATED SIGNALS HAVING WINDOW FUNCTION

(75) Inventors: Samir Kapoor, Voorhees, NJ (US); Slobodan Nedic, Plainsboro, NJ (US)

(73) Assignee: NEC USA, Inc., Princeton, NJ (US)

( * ) Notice: Subject to any disclaimer, the term of this patent is extended or adjusted under 35 U.S.C. 154(b) by 0 days.

(21) Appl. No.: 09/288,478

(22) Filed: Apr. 8, 1999

(51) Int. Cl.
*H04B 14/06* (2006.01)

(52) U.S. Cl. ............... 375/350; 375/260; 375/232; 375/222; 708/300; 708/323

(58) Field of Classification Search ........ 375/229–233, 375/350, 254, 349, 354, 260; 329/315–321; 708/300, 323
See application file for complete search history.

(56) References Cited

U.S. PATENT DOCUMENTS

| | | | |
|---|---|---|---|
| 5,903,608 A * | 5/1999 | Chun | 370/468 |
| 6,047,025 A * | 4/2000 | Johnson et al. | 375/232 |
| 6,353,629 B1 * | 3/2002 | Pal | 375/222 |
| 6,396,886 B1 * | 5/2002 | Kapoor | 375/350 |
| 6,459,744 B1 * | 10/2002 | Helard et al. | 375/354 |

OTHER PUBLICATIONS

Seong-Jo Na et al.; Design and implementation for 125mW/MIPS ultra-high speed asymmetric digital subscriber line transceiver chip; The First IEEE Asia Pacific Conference on, 1999 pp 21-24.*

* cited by examiner

*Primary Examiner*—Khai Tran
*Assistant Examiner*—Edith Chang
(74) *Attorney, Agent, or Firm*—Ostrolenk, Faber, Gerb & Soffen, LLP

(57) ABSTRACT

A receiver for improving the performance of conventional Discrete Multitone Modulation (DMT) based Asymmetric Digital Subscriber Line (ADSL) modems, in the presence of noise and/or interference. A demodulator having an FFT followed by a single-tap-per-bin frequency-domain equalizer is augmented by an additional data-path utilizing windowing or pulse shaping. Windowing is done independently for each symbol over the orthogonality interval and efficiently in the time domain or frequency domain. A decision feedback equalizer at the output of the windowed data-path cancels inter-bin-interference created by windowing.

46 Claims, 14 Drawing Sheets

DFE with 2 feedback taps

Different FDW Magnitude Responses

Long Loop With NBI Signal And Noise PSD'S Before TEQ

Long Loop With NBI Signal And Noise PSD'S After TEQ

Long Loop With NBI Profile

Long Loop With NBI Bit-Allocation Profile

Medium Loop with NBI Signal And Noise PSD'S Before TEQ

Medium Loop with NBI Signal And Noise PSD'S After TEQ

Medium Loop With NBI SNR Profile

Medium Loop With NBI Bit-Allocation Profile

Medium Loop With Crosstalk Signal And Noise PSD'S Before TEQ

Medium Loop With Crosstalk Signal And Noise PSD'S After TEQ

Medium Loop With Crosstalk SNR Profile

Medium Loop With Crosstalk Bit Allocation Profile

Medium Loop With Crosstalk Without TEQ SNR Profile

Medium Loop With Crosstalk Without TEQ Bit Allocation Profile

RECEIVER FOR DISCRETE MULTITONE MODULATED SIGNALS HAVING WINDOW FUNCTION

BACKGROUND OF THE INVENTION

The fast, efficient and error-free transmission of digital information from one point to another has become increasingly important. Many communications systems exist which permit digital information to be transmitted over various types of communication channels, such as wireless channels, fiber-optic channels, and wire line channels.

The present invention relates to a receiver for DMT based (Discrete Multitone Modulation) signals and preferably for DMT ADSL (Asymmetric Digital Subscriber Line) and Lite ADSL modems. In particular, it relates to receiver windowing and allied techniques. Some related techniques have been previously considered as possible solutions to combat narrow band interference (NBI) and spectrally colored crosstalk for DMT transceivers. Windowing, or more generally, pulse/waveform shaping filtering, can be carried out over single or multiple DMT symbols and can be carried out jointly or singly at the transmitter and receiver. Several existing methods require the participation of the transmitter and/or utilize window/pulse shapes that span one or more DMT symbols and improve performance based on better spectral containment.

However, in the context of current ANSI and ITU-T DMT based ADSL standards, no pulse shaping is used at the transmitter. Thus, any methods which require the transmitter to perform waveform shaping will either have to be standardized or will result in a proprietary standard non-compliant modem. There exist methods which do not require transmitter participation but do require substantially equalized channels (e.g. NEC's ADSL modem has provision for partial shaping at the boundaries of the orthogonality interval).

The present invention will be described in the context of a wireline communications channel, such as a telephone line which utilizes a twisted pair of copper wires. It is noted that the use of the present invention is not limited to wireline systems as those skilled in the art will appreciate from the discussion hereinbelow.

A modem is typically used to transmit and receive digital data over a telephone line. Modems employ a modulator to transmit the digital data over the telephone line and a demodulator to receive digital data from the telephone line. One common modulation technique is known as discrete multi-tone modulation (DMT) which requires a discrete multi-tone transmitter and a discrete multi-tone receiver at each modem in a communication system. Often, those skilled in the art refer to such modems as employing a DMT physical layer modulation technique.

Reference is now made to FIG. 14 which is a block diagram of a conventional DMT communications system 1. The system 1 includes a DMT transmitter 10, a transmission channel 20, and a DMT receiver 30. The DMT transmitter 10 includes a symbol generator 12, an inverse fast Fourier transform (IFFT) modulator 14 and a cyclic prefix generator 16. The DMT transmitter 10 receives an input bit stream b(n) which is fed into the symbol generator 12. The symbol generator 12 produces a signal X(k) which is fed into the IFFT modulator 14. X(k) is a complex signal (i.e., a signal understood by those skilled in the art to comprise both a real and an imaginary component) formed by mapping groups of bits of the input bit stream b(n) into a complex data space such that the complex signal X(k) has a length of N samples.

Symbol generator 12 also augments the signal X(k) with a complex conjugate to obtain a conjugate symmetric signal of 2N samples.

The IFFT modulator 14 performs a 2N-point inverse fast fourier transform on the conjugate complex signal X(k) to obtain the sampled real signal x(n). Since X(k) is a symmetric signal, the output of the IFFT modulator 14 is a real signal x(n). The real signal x(n) may be thought of as the summation of a plurality of cosine functions each having a finite length and a different frequency, phase, and amplitude, where these frequencies are multiples of a fundamental frequency. Since each of the cosine functions has a finite duration, x(n) is a varying amplitude discrete signal having a finite duration spanning 2N samples. Each cosine function is known as a bin or tone.

The transmission channel 20 is modeled as including a D/A converter 22, transmit filter (not shown), a receive filter (not shown), and an A/D converter 26 on either end of a wire loop 24. Those skilled in the art will appreciate that a practical system will employ the D/A converter 22 (and the transmit filter) in the DMT transmitter 10 and will employ the A/D converter 26 (and the receive filter) in the DMT receiver 30.

Those skilled in the art will appreciate that the frequency spectrum of x(n) may be thought of as a plurality of orthogonal (SIN X)/(X) functions, each centered at a respective one of the frequencies of the cosine functions of x(n).

x(n) is transmitted over the channel 20 to the DMT receiver 30. Since the transmission channel 20 has a non-ideal impulse response h(n), the received signal y(n) will not exactly match x(n). Instead, y(n) will be a function of the convolution of x(n) and h(n). Typically, h(n) will look substantially like the curve shown in FIG. 15. The non-ideal characteristic of h(n) introduces an amount of interference (specifically intersymbol and interchannel interference) which should be compensated for in both the DMT transmitter 10 and the DMT receiver 30.

A common technique in compensating for the non-ideal impulse response of the transmission channel 20 is to introduce a so-called guard band at the beginning of each finite duration signal x(n) to produce x'(n). The cyclic prefix generator 16 performs this function. The guard band is typically formed of the last G samples of x(n) for each DMT symbol. If the length of the impulse response h(n) of the transmission channel 20 is less than or equal to G+1, then the guard band of length G will be sufficient to eliminate the interference caused by the impulse response h(n). The guard band is commonly referred to in the art as a "cyclic prefix" (CP).

Unfortunately, the impulse response h(n) of a typical transmission channel 20 may be excessively long, requiring cyclic prefix lengths which substantially reduce the rate at which digital bits are transmitted across the transmission channel 20. The DMT receiver 30, therefore, employs signal processing techniques which effectively shorten the impulse response h(n) of the transmission channel 20, thereby permitting a corresponding reduction in the length of the cyclic prefix required at the DMT transmitter 10.

The DMT receiver 30 includes a time-domain equalizer (TEQ) 32, CP remover 34 for removing the cyclic prefix, a fast fourier transform (FFT) demodulator 36, and a bit generator 38. The time-domain equalizer 32 is a finite impulse response (FIR) filter designed to compensate for the non-ideal impulse response h(n) of the transmission channel 20. In particular, the time-domain equalizer 32 employs a finite number of coefficients (T) which are calculated to compensate for the non-ideal impulse response of the transmission channel 20. The time domain equalizer 32 operates on the impulse response h(n) of the channel 20 such that the combined impulse response $h_{\it eff}(n)$ of the channel 20 and the time domain equalizer 32 has maximum energy within a limited band of samples. This may be thought of as "shortening" the effective impulse response of the channel 20. The output of the time domain equalizer is z'(n).

The CP remover 34 is employed to remove the cyclic prefix from z'(n) to obtain z(n). The signal z(n) is input into the FFT demodulator 36 (which is understood to include a one-tap per-bin frequency domain equalizer/AGC function) to produce the complex symmetric signal X(k). After the complex conjugate portion of the signal X(k) is removed, the bit generator 38 maps the complex signal X(k) into an output bit stream b(n), which theoretically matches the input bit stream b(n).

While the conventional DMT receiver 30 of FIG. 14 operates optimally when white noise is present at the output of the time domain equalizer 32, it is susceptible to increased interference when colored noise is present. This is particularly pronounced when the colored noise exhibits spectral nulls or spectral peaks.

Colored noise may be present at the output of the time domain equalizer 32 because (i) additive colored noise was injected into the signal x'(n) as it was transmitted over the transmission channel 20; and/or (ii) the time domain equalizer 32 itself introduces spectral shaping (especially spectral nulls/peaks) into the signal z'(n). Thus, even if the transmission channel 20 does not introduce additive colored noise into the received signal y(n), the time domain equalizer 32 may itself introduce spectral coloration into the additive noise of signal z'(n). Consequently, although the time domain equalizer 32 may produce a "shorter" effective impulse response $h_{\it eff}(n)$, it may degrade system performance by introducing colored noise (especially spectral nulls/peaks) into z'(n). In particular, the rate at which data bits b(n) are transmitted over the transmission channel 20 and the error rate of such transmission may be adversely affected by colored noise at the output of the time domain equalizer 32.

Accordingly, there is a need in the art for an improved DMT communication system which is capable of (i) improved performance in the presence of noise, and in particular, narrowband interference and inter-bin interference; (ii) compensating for additive colored noise and/or narrowband interference (NBI) introduced by the transmission channel and/or other conditions leading to diminished orthogonality between bins including inadequate channel shortening, symbol timing offset and jitter; (iii) mitigating against the spectral coloration of additive noise by the time domain equalizer; (iv) suppressing side lobes caused by DFT frequency response; (v) obtaining better performance against cross-talk and narrowband interference (NBI) without changing the transmitter; and/or (vi) suppressing a specific type colored noise in the form of local echo signal cross-talk in the FDM duplexing method.

SUMMARY OF THE INVENTION

The present invention provides a receiver for DMT-ADSL modems which does not require transmitter pulse shaping. The receiver of the invention carries out windowing independently for each symbol over its entire orthogonality interval (excluding the cyclic prefix). Either one of two equivalent methods may be used for windowing—time-domain windowing (TDW) or frequency-domain windowing (FDW). A conventional demodulator consisting of an FFT (Fast Fourier Transform) type detector followed by a single-tap-per-bin frequency-domain equalizer (FEQ) is augmented by an additional data-path utilizing windowing. A decision feedback equalizer (DFE) type detector is used at the output of the windowed data-path to cancel inter-bin-interference (IBI) created by windowing. Pilot-bins are employed to reduce the threat of error propagation in the DFE. The receiver architecture of the invention does not require any changes to the ADSL standard specifications (such as ANSI T1.413 issue 2, ITU-T G.992.1 and ITU-T G.992.2) and is relatively simple to implement.

Windowing is most effective against narrowband interference (NBI) and other conditions which lead to diminished orthogonality between bins such as inadequate channel shortening, symbol timing offset and jitter. Limited performance gains may also be achieved in the presence of crosstalk with strong spectral coloration.

The advantages of the invention are several. For one, the present invention does not require any cooperation from the transmitter, rendering it impervious to standardization issues (at least in the case of ADSL standards).

Additionally, the overall method of the invention is relatively simple to implement and can provide significant performance gains for certain interference conditions compared to other windowing and equalization techniques.

Further, the overall technique is potentially applicable with minor modifications to a number of DMT based modems such as ADSL, VDSL (Very High Bit-Rate Digital Subscriber Line) and wireless OFDM (Orthogonal Frequency Division Multiplexing) systems.

Windowing according to the invention can be carried out in the time-domain (TDW) or in the frequency-domain (FDW). Each approach has its own advantages and disadvantages, mainly in terms of implementation issues, which are discussed in detail below.

TDW is done by a sample-by-sample multiplication of the received signal samples by the window coefficients prior to the FFT in a second data path.

FDW is done after the FFT on a bin-by-bin basis by taking a linear combination of bin outputs and frequency-domain window coefficients. A conventional demodulator is provided in a first data path. The conventional demodulator may use a single-tap-per-bin FEQ for each bin after the FFT. The second data path is the windowed data-path and uses a DFE to cancel the IBI caused by windowing. The DFE makes use of prior decisions made on sub-symbols (bins) within the same DMT symbol. An alternative implementation of the FDW can also be carried out by using the output of the FEQ in the first data path instead of the FFT output. This also necessitates a change in the DFE coefficients, though its overall structure is unchanged. To initiate the equalization procedure each symbol-time, pilot bins (deterministic sub-symbols) can be utilized. Following the DFE and the FEQ from the two data paths, the receiver has a bin-select logic stage which selects the output of either data path for input to a slicer. This determination can be made after the achieved SNR (Signal to Noise Ratio) in each bin has been measured from each data path and corresponding bit-loading profiles have been computed. A DFE error-propagation SNR penalty is applied to the achieved SNR in the windowed data path before computing its bit-loading profile. One criterion to select either data path for a given bin is to select the path which yields higher bits-per-bin (the unwindowed data path can be chosen in case of a tie). This issue is discussed in more detail below.

According to a first aspect, the invention comprises a receiver providing a demodulated output from a received discrete multi-tone modulated input signal, the input signal received from a communication channel having noise thereon, the input signal having modulated thereon a digital bit stream, the receiver comprising: first and second data paths coupled to receive the input signal; the first of the two data paths comprising a first stage having a frequency response for applying a discrete Fourier Transform to the input signal and further comprising a frequency domain equalizer having an input coupled to an output of the first stage; the second of the two data paths comprising a window stage for suppressing side lobes of the frequency response of the first stage; and a logic stage for selecting an output from the first data path or the second data path based on a predefined test and for providing the selected output representing the demodulated digital bit stream.

According to a second aspect, the invention comprises a decision feed back equalizer in said second data path having as an input an output from said window stage and for cancelling inter-bin interference created by said window stage.

According to a third aspect, the decision feedback equalizer receives a feedback signal from an output of said logic stage to cancel the inter-bin interference.

According to a further aspect, the invention comprises a slicer stage having as an input the output of said logic stage and providing as an output the demodulated digital bit stream; said demodulated digital bit stream being provided as said feedback signal.

According to yet still a further aspect, the window stage in said second path comprises a time domain window stage.

According to yet still a further aspect, the time domain window stage has an input directly from a time domain equalizer.

According to yet still a further aspect, the invention comprises a second stage for performing a discrete Fourier transform in said second path, the second stage having an input receiving an output from said time domain window stage.

According to yet still another aspect, the invention comprises a decision feedback equalizer in said second data path having an input from said second stage and having an output provided to said logic stage.

According to yet still a further aspect, the decision feedback equalizer receives a further input from said first stage.

According to yet still a further aspect, the window stage in the second data path comprises a frequency domain window stage.

According to yet still another aspect, the invention comprises a decision feedback equalizer in said second data path having an input receiving an output from said frequency domain window stage, said decision feedback equalizer being provided for cancelling inter-bin interference created by the frequency domain window stage; an output of said decision feedback equalizer being provided to said logic stage.

According to yet still another aspect, the decision feedback equalizer receiving as an input/output from the frequency domain window stage has a further input from said first stage.

According to still yet a further aspect, a feedback signal is provided from an output of said logic stage to said decision feedback equalizer to cancel inter-bin interference created by said frequency domain window stage.

According to yet still another aspect, the logic stage provides an output to a slicer stage, the slicer stage providing said demodulated digital bit stream as an output, said feedback signal comprising said demodulated output.

According to yet still a further aspect, the frequency domain window stage has an input coupled to an output of said first stage.

According to yet still a further aspect, the logic stage selects data from the first data path or the second data path based on determining which data path provides more bits per symbol or some other criteria such as higher SNR margin.

According to yet still a further aspect, in the event of a tie, the logic stage selects the first data path.

According to yet still a further aspect, the window stage comprises one of a Hanning window function, a rectangular window function, DPS window function and a Bartlett window function.

According to yet still a further aspect, the time domain window stage performs time domain pulse shaping by a sample-by-sample multiplication of the output from the time domain equalizer by window coefficients defining a time domain window function of the time domain window stage.

According to yet still a further aspect, the frequency domain window stage performs frequency domain pulse shaping on a bin-by-bin basis by performing a linear combination of bin outputs and frequency domain window coefficients defining a frequency domain window function of the frequency domain window stage.

According to yet still another aspect, the frequency domain equalizer comprises a one-tap per-bin equalizer.

According to yet still a further aspect, the receiver further comprises a time domain equalizer having as an input the input signal received from the communication channel, the time domain equalizer having an output provided to the first and second data paths.

According to yet another aspect, the frequency domain window stage has an input from an output of the frequency domain equalizer.

According to yet still a further aspect, the invention comprises a method for providing a demodulated output from a received discrete multi-tone modulated input signal, the input signal received from a communication channel having noise thereon, the input signal having modulated thereon a digital bit stream, the method comprising: providing the input signal to first and second data paths; applying a discrete Fourier Transform to the input signal in the first data path to produce a first transformed signal and further comprising frequency domain equalizing the first transformed signal to provide a frequency domain equalized signal; suppressing side lobes of the first transformed signal by applying a window function to the input signal in a second data path to provide a pulse shaped signal; selecting an output from the first data path or the second data path based on a predefined test and providing the selected output representing the demodulated digital bit stream.

According to another aspect, the method comprises performing decision feed back equalizing in said second data path on said pulse shaped signal for cancelling inter-bin interference created by said window function.

According to a further aspect, the method comprises using a feedback signal during said step of decision feedback equalizing to cancel the inter-bin interference.

According to a further aspect, the method comprises providing a slicer stage having as an input the selected output and providing as an output the demodulated digital bit stream; said demodulated digital bit stream being provided as said feedback signal.

According to yet still a further aspect, the step of applying a window function in said second path comprises applying a time domain window function.

According to yet still a further aspect, the invention comprises applying said time domain window function directly to the input signal.

According to yet still a further aspect, the method comprises performing a discrete Fourier transform in said second data path to provide a second transformed signal, the discrete Fourier transform in said second data path operating on said pulse shaped signal.

According to yet still a further aspect, the method comprises performing decision feedback equalizing in said second data path on said second transformed signal and providing a decision feedback equalized signal as an output of said second data path.

According to yet still a further aspect, the method comprises, during the step of decision feedback equalizing, receiving a further input comprising said first transformed signal.

According to yet still a further aspect, the step of applying a window function in the second data path comprises applying a frequency domain window function to provide a frequency domain shaped signal.

According to yet still a further aspect, the step of decision feedback equalizing in said second data path comprises operating on said frequency domain shaped signal thereby cancelling inter-bin interference created by the frequency domain window function; and providing a decision feedback equalized signal as an output of said second data path.

According to yet still a further aspect, the method comprises using the frequency domain equalized signal from the first data path during the step of decision feedback equalizing in the second data path.

According to yet still another aspect, the method comprises providing a feedback signal comprising the selected output for use during the step of decision feedback equalizing to cancel inter-bin interference created by said frequency domain window function.

According to yet still a further aspect, the method comprises slicing the selected output to provide said demodulated digital bit stream as an output, said feedback signal comprising said demodulated output.

According to yet still a further aspect, the frequency domain window function operates on said first transformed signal.

According to yet still a further aspect, the step of selecting an output from the first data path or the second data path comprises selecting output based on determining which data path provides more bits per symbol.

According to yet still a further aspect, in the event of a tie, the step of selecting an output comprises selecting the first data path.

According to yet still a further aspect, the window function comprises one of a Hanning window function, a rectangular window function, a DPS window function and a Bartlett window function.

According to yet still a further aspect, the step of applying a time domain window function comprises time domain pulse shaping by a sample-by-sample multiplication of the time domain equalized signal by window coefficients defining the time domain window function.

According to yet still a further aspect, the step of applying a frequency domain window function comprises frequency domain pulse shaping on a bin-by-bin basis by performing a linear combination of bin outputs and frequency domain window coefficients defining the frequency domain window function.

According to yet still another aspect the step of frequency domain equalizing the first transformed signal comprises using a one-tap per-bin equalizer to frequency domain equalize the first transformed signal.

According to a further aspect, the invention includes the step of time domain equalizing the input signal received from the communication channel, and providing a time domain equalized signal to the first and second data paths.

According to still a further aspect, the invention includes the step of applying the frequency domain window function to the frequency domain equalized signal.

Other features and advantages of the present invention will become apparent from the following detailed description of the invention which refers to the accompanying drawings.

DETAILED DESCRIPTION OF EMBODIMENTS
OF THE INVENTION

First, a DMT signal model will be discussed. Consider a discrete time DMT system model in which N orthogonal sinusoids (tones/bins) are transmitted each symbol time using 2N samples per symbol. The nth time domain sample of the normalized transmitted signal for the ith bin is given by $$s_i(n) = \frac{2}{\sqrt{2N}}[I_i\cos(w_i n) - Q_i\sin(w_i n)] \quad n \in [0, 2N-1], \tag{1.1}$$

-continued $$i \in [0, N-1]$$

where $I_i$ and $Q_i$ are the real and imaginary parts of the ith complex frequency domain sub-symbol $a_i = I_i + jQ_i$ chosen from a QAM constellation; $j = \sqrt{-1}$; $w_i = 2\pi i/2N$ is the angular frequency in radians/sample of the ith bin. Denoting the minimum and maximum active bin number by $b_{min}$ and $b_{max}$ respectively, the nth sample of the composite transmitted signal is given by $$x(n) = \sum_{i=b_{min}}^{b_{max}} s_i(n) \quad (1.2)$$

Let the sample rate be $f_s$ samples/sec. Each symbol is prefixed with a cyclic prefix (CP) of duration $T_{CP} = G/f_s$ seconds by setting $$x(-n) = x(2N-n), n \in [1, G] \quad (1.3)$$

Figure 14:
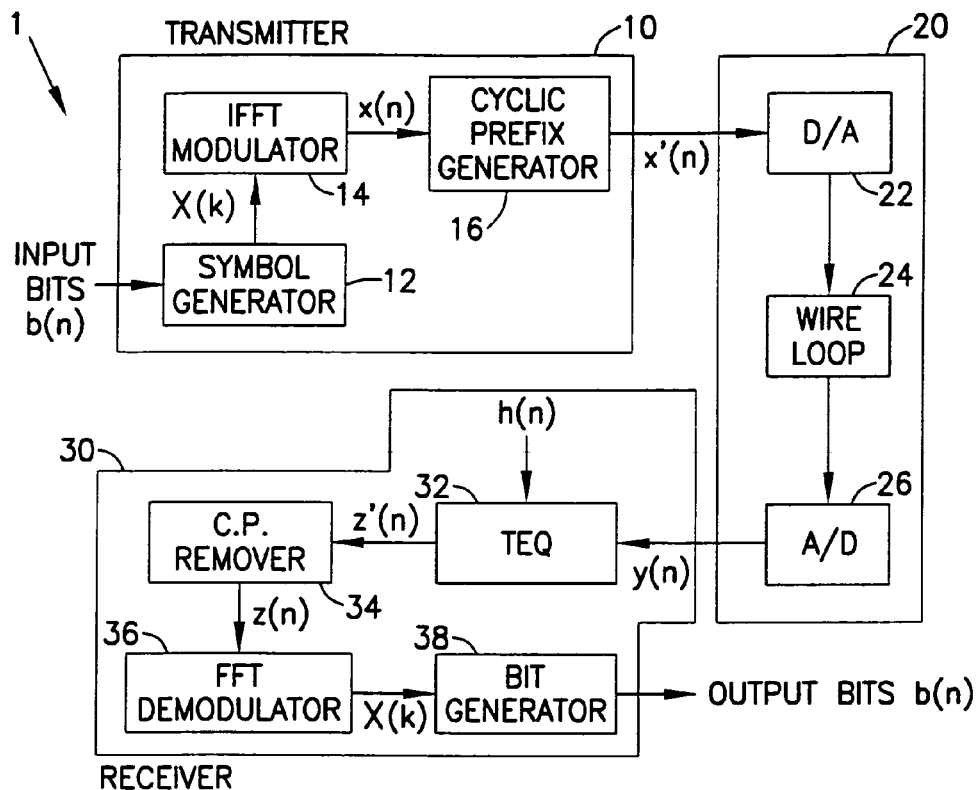
FIG. 14 is a block diagram showing a typical prior art DMT channel having a DMT transmitter, communications channel and DMT receiver.
Figure 15:
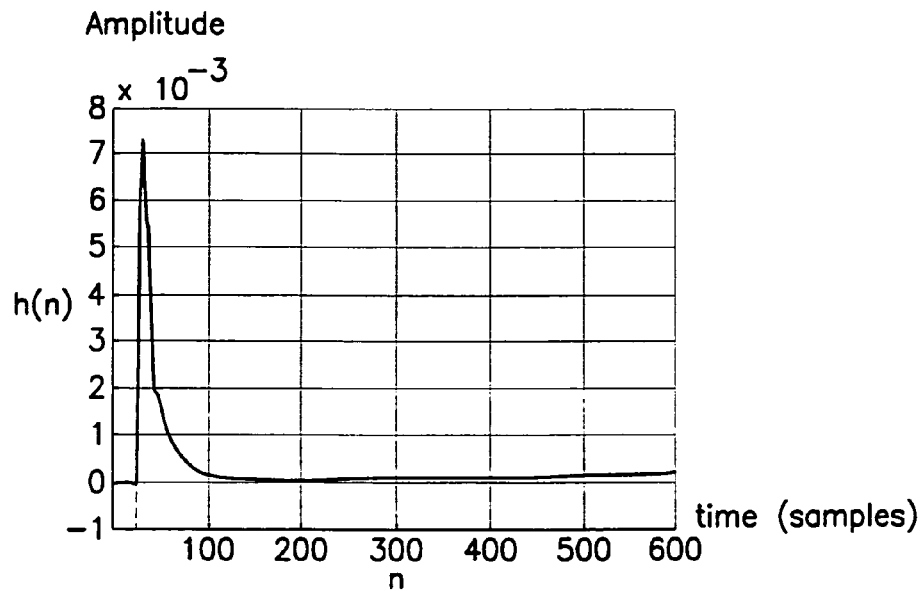
FIG. 15 is a graph showing the impulse response of a typical communications channel.

For example, as per the T1.413 ANSI standard for full-rate ADSL and for ADSL-Lite, the upstream (from ATU-R to ATU-C) a parameters are (See ADSL T1.413 Issue 2 Recommendation, Committee T1E1.4, November 1998): N=32, G=4, $f_s$=276 KHz (no oversampling). Typical values for $b_{min}$ and $b_{max}$ are 6 and 31 respectively (implementation dependent). The CP merely serves as a guard time, albeit with a special cyclical structure. Inter-symbol-interference is eliminated and orthogonality between bins is preserved when the CP duration exceeds the channel impulse response (CIR) i.e. when $G \geq U$. The effective discrete-time CIR encountered by the above signal include the analog communication channel, transmitter D/A, receiver A/D, interpolation and front-end filtering in the ATU-C and ATU-R. Thus, let the discrete-time composite CIR be denoted by h(n) and assume that it spans a maximum duration $T_{CIR} = U/fs$ seconds. The channel transfer function is assumed to be linear, time-invariant and causal. Taking the channel and additive noise into account, the discrete time received signal is given by $$r(n) = x(n) * h(n) + z(n) \quad (1.4)$$

where z(n) denotes the composite discrete-time AWGN (Additive White Gaussin Noise) and crosstalk samples and * denotes the linear convolution operation. After discarding the CP using CP remover 34 (See FIG. 14), a conventional receiver performs a Discrete Fourier Transform (DFT) operation via the FFT algorithm each symbol time. See FFT 36 of FIG. 14. This is followed by a single-tap-per-bin frequency domain equalizer (FEQ) contained within FFT 36 of FIG. 14.

A key aspect of the inventive technique which differentiates it from the conventional configuration (FFT followed by FEQ) described above is the use of a parallel windowing stage followed by a decision feedback equalizer (DFE) to cancel the window-induced inter-bin-interference (IBI). Windowing can be implemented equivalently in the time- or frequency-domains depending on the window type, computational constraints and convenience of implementation. See FIGS. 1 and 2.

Figure 1:
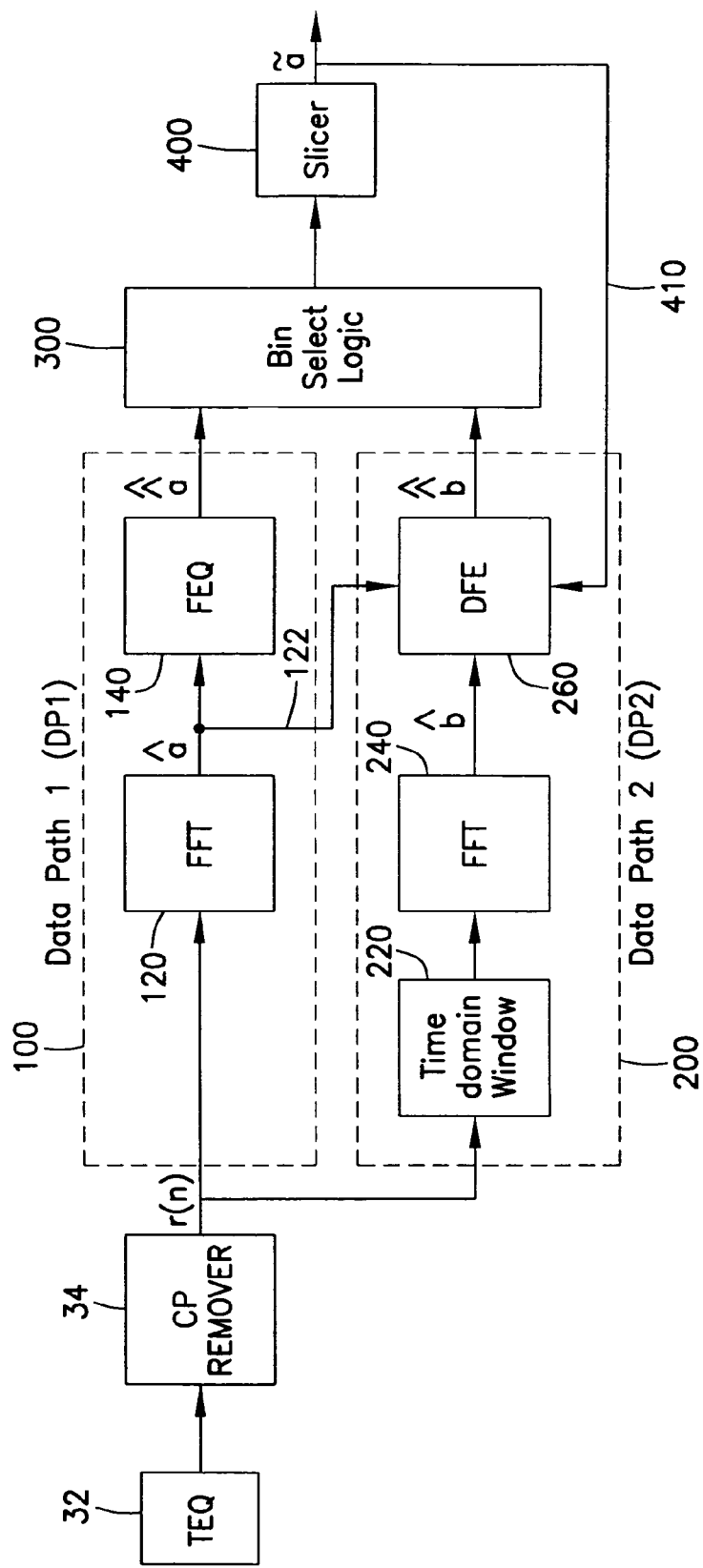
FIG. 1 shows the demodulator architecture of the invention with time domain windowing.
Figure 2:
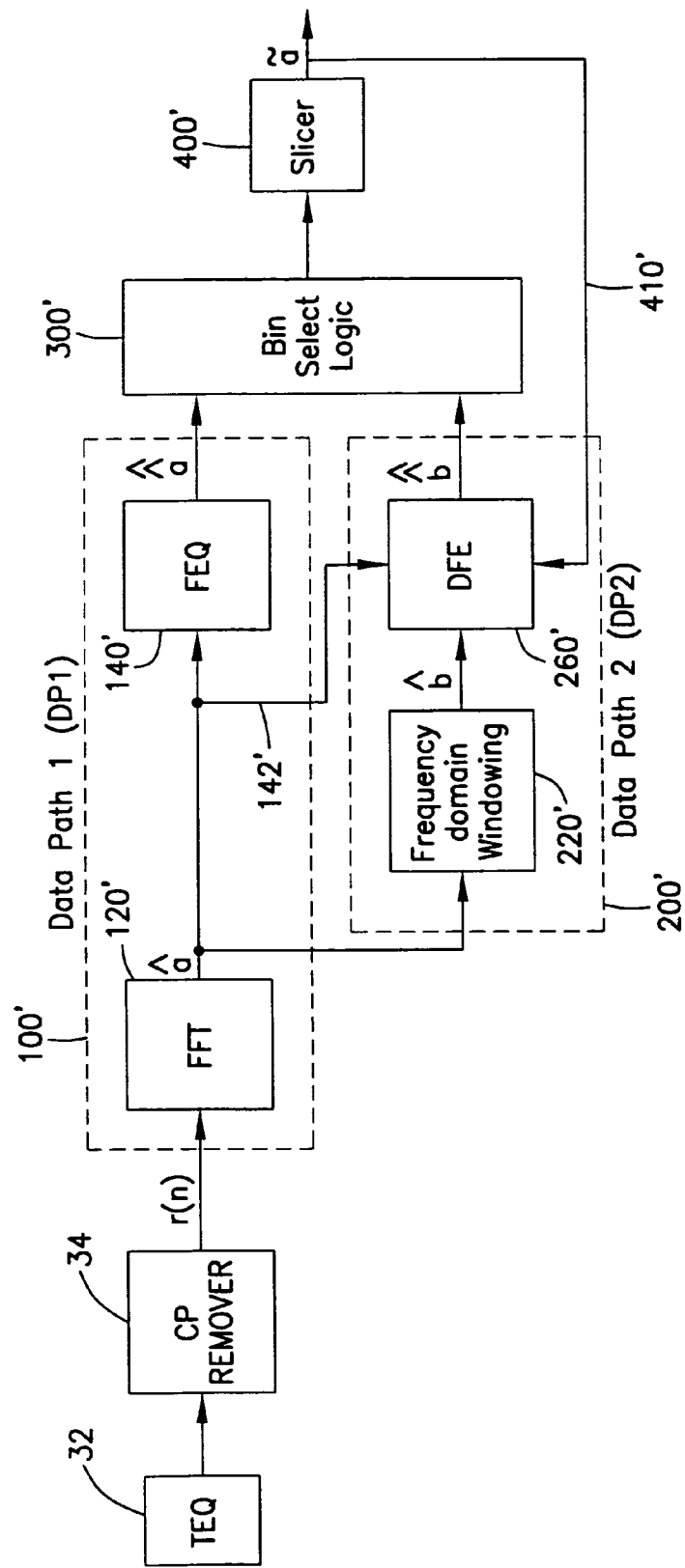
FIG. 2 shows the demodulator architecture according to the invention with frequency domain windowing.

FIG. 1 shows a TDW implementation and FIG. 2 shows an FDW implementation.

FIG. 1 shows a DMT receiver using time domain windowing. The invention is employed after the CP remover 34 of FIG. 14, i.e., the input is provided from the output of CP remover 34, preferably after being time domain equalized by TEQ 32. Following the standard TEQ 32 and the CP remover 34, the output of the CP remover is provided to two data paths 100 and 200. The first data path 100 (DP1) is a conventional data path employing FFT 120 and an FEQ 140. The output of the FEQ is provided to the bin select logic 300. In the additional data path 200 (DP2), time domain windowing is performed by the time domain window 220. The output of the time domain window 220 is provided to an FFT 240 whose output is provided into the DFE 260. The output of FFT 120 is also provided to the DFE 260 via line 122. The output of DFE 260 is provided to the bin select logic 300, which will be described in more detail below. The output of the bin select logic 300 is provided to a slicer circuit 400 which provides the demodulated output. The demodulated output is also provided in the feedback path 410 to the DFE 260.

FIG. 2 shows the DMT demodulator employing frequency domain windowing. The CP remover 34 output is provided to a first data path 100' (DP1) which includes the FFT 120' and an FEQ 140'. The output of the FFT 120' is provided to a second data path 200' (DP2) where frequency domain windowing is performed. The output of the frequency domain window 220' is provided to the DFE 260'. The output of the DFE 260' is provided to the bin select logic 300'. The output of FEQ 140' from the first data path 100' is also provided to the bin select logic. The output of the bin select logic 300' is provided to slicer circuit 400' which provides the output of the demodulator. A feedback path 410' is provided from the output of the slicer circuit 400' to the DFE 260'. FEQ 140' provides coefficients for DFE 260' via path 142'.

The goal of receiver windowing is to enable suppression of the side-lobes of the Discrete Fourier Transform (DFT) frequency response and consequently obtain better performance against crosstalk and narrowband interference (NBI), while keeping the transmitter unchanged.

Time-domain windowing (TDW) is performed by a sample-by-sample multiplication of 2N received signal samples each symbol time with the window coefficients. For this purpose, a variety of windows may be used. For example, the normalized Hanning window is given by:

$$(n) = (1 - \cos w_n), n \in [0, 2N-1] \quad (2.1)$$

Figure 3:
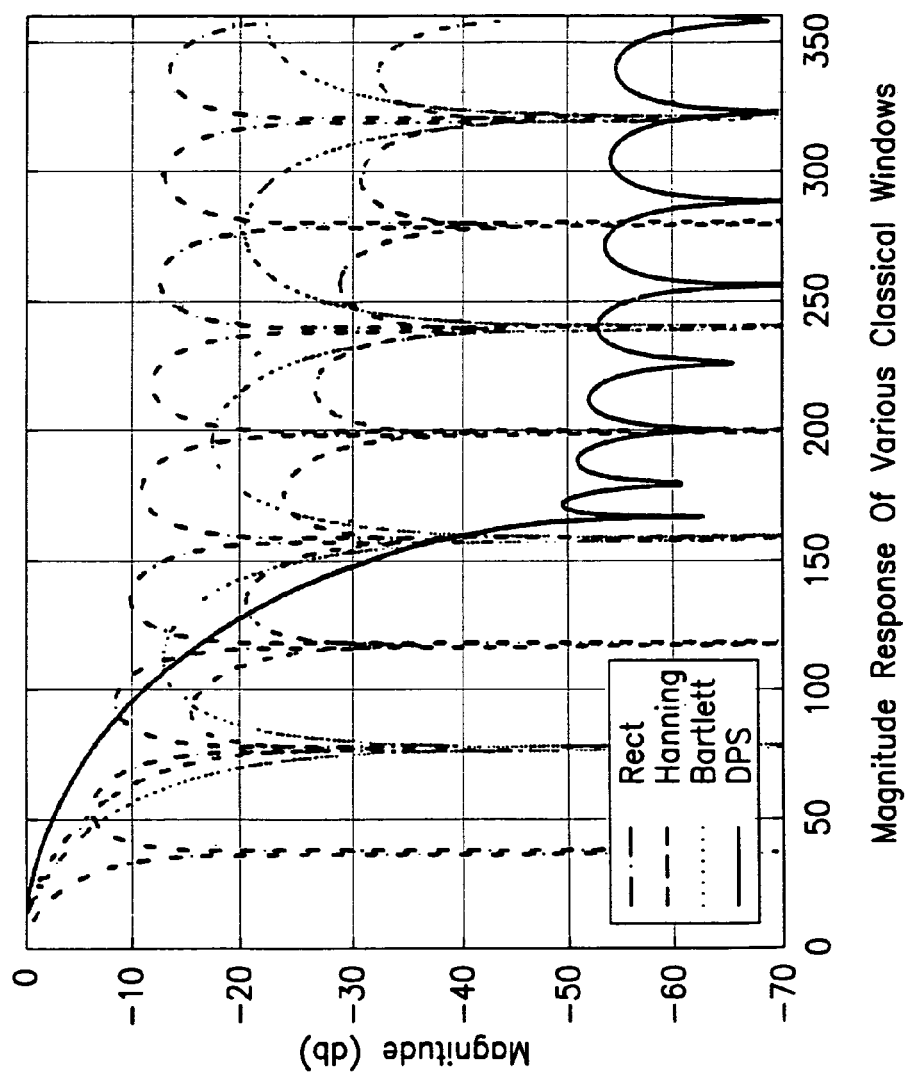
FIG. 3 shows the magnitude response of various classical windows.

FIG. 3 depicts the frequency response of several windows. The DPS (Discrete Prolate Spheroidal) window is designed to have the narrowest main-lobe whose side-lobes are no higher than −50 dB relative to the main-lobe peak. Turning now to the receiver architecture of FIG. 1, the upper box 100 marked as Data-Path 1(DP1) is the conventional demodulator described above. The lower box 200 marked as Data-Path 2 (DP2) is the new portion including time domain windowing. Incoming samples simultaneously pass through both DP1 and DP2. The ith demodulated sub-symbol (after FFT) in DP1 is denoted by $\hat{a}_i$ and in DP2 by $\hat{b}_i$. Then, $$\hat{a}_i = \frac{1}{\sqrt{2N}} \sum_{n=0}^{2N-1} r(n) e^{-jw_i n} = \alpha_i a_i + u_i \quad (2.2)$$

-continued $$\hat{b}_i = \frac{1}{\sqrt{2N}} \sum_{n=0}^{2N-1} r(n)w(n)e^{-jw_i n} = \beta_i a_i + v_i + \mu_i$$

where $$\alpha_i = \sum_{u=0}^{U-1} h(u)e^{-jw_i u} \quad (2.3)$$

$$\beta_i = c_0 \alpha_i$$

$$u_i = \frac{1}{\sqrt{2N}} \sum_{n=0}^{2N-1} z(n)e^{-jw_i n}$$

$$v_i = \frac{1}{\sqrt{2N}} \sum_{n=0}^{2N-1} z(n)w(n)e^{-jw_i n}$$

$$c_k = \frac{1}{2N} \sum_{n=0}^{2N-1} w(n)e^{-jw_k n}$$

$$\mu_i = \sum_{\substack{l=b_{min}\\l\neq i}}^{b_{max}} a_l \alpha_l c_{l-i}$$

In the above, $\mu_i$ denotes the window-induced IBI experienced by the ith bin from all other active bins. The window coefficients $c_k$ may be normalized such that $c_0=1$ (assumed to be used throughout). For example, for a Hanning window, $c_0=1$, $c_{-1}=c_{+1}=-0.5$.

Note that $\mu_i$ vanishes for the special case of rectangular windowing (w(n)=1 for all n). The multiplication of the window samples with the DMT symbol samples in the time-domain followed by an FFT is equivalent to a frequency-domain convolution. In other words, windowing can be carried out efficiently in the frequency domain as $$\hat{b}_i = \sum_{l=-L}^{L} \hat{a}_{i+l} c_l \text{ and } v_i = \sum_{l=-L}^{L} u_{i+l} c_l \quad (2.4)$$

Several properties of the post-FFT noise sequences $\{u_i\}$ and $\{v_i\}$ are apparent.

1. If $\{z(n)\}$ is zero-mean and Gaussian, $u_i$ and $v_i$ are also zero-mean and Gaussian. This follows from (2.3) where $u_i$ and $v_i$ are obtained as linear combinations of the noise samples z(n).

2. Assume $\{z(n)\}$ is a realization of a wide-sense stationary random process. If $r_z(n)$ and $P_z(w)$ denote the discrete time nth auto-correlation coefficient and Power Spectral Density (PSD) of $\{z(n)\}$ respectively, the variance of $u_i$ is given as (2.4(a))

3. If $\{z(n)\}$ is white ($r_z(n)=\sigma^2\delta(n)$, $P_z(w)=\sigma^2/2\pi$), then the auto-correlation functions of $u_i$ and $v_i$ from bin-to-bin are given by $$\sigma_u^2(i) = E[|u_i|^2] = \sum_{n=-(2N-1)}^{2N-1} (1-|n|/2N)r_z(n)e^{-jw_i n} \quad (2.4(b))$$

-continued $$= P_z(w) * \frac{\sin^2(2Nw/2)}{2N\sin^2(w/2)}\bigg|_{w=w_i}$$

$$r_u(i) = \sigma^2 \delta(i)$$

$$r_v(i,k) = \sum_m \sum_l r_u(k+m-i-l)c_l c_m^*$$

Thus, $u_i$ is a white sequence from bin-to-bin while $v_i$ is spectrally colored as per the windowing function. Their respective variances $\sigma_u^2$ and $\sigma_v^2$ (for any bin) are given by $$\sigma_u^2 = \sigma^2 \quad (2.5)$$

$$\sigma_v^2 = \sigma^2 \left( \frac{1}{2N} \sum_{n=0}^{2N-1} w(n)^2 \right) = \sigma^2 \sum_{l=-L}^{L} |c_l|^2$$

4. In the presence of additive white Gaussian noise (AWGN) only, it is seen from equation (2.5) that the window which attains the minimum mean square error (MMSE) at the FFT output is rectangular. Any other window (which will have some non-zero coefficients $c_l$ for l≠0) will result in a higher MSE. In other words, if the transmitter uses rectangular windowing, the optimal receive window at the receiver, in the MMSE sense, in the presence of AWGN only (i.e. no colored noise), is also rectangular. Thus, if spectrally colored crosstalk noise or narrowband interference (NBI) is absent, or weakly present, there is no advantage gained by receiver windowing. In fact, receiver windowing will incur a SNR degradation as given by equation (2.5). This assumes that there is no error propagation (which further degrades performance). On the other hand, in the presence of NBI and/or severely spectrally colored noise, $\sigma_v^2(i)$ can be several dB lower than $\sigma_u^2(i)$ depending on the choice of window and the spectral location, type and strength of the interference.

Equations (2.3) and (2.4) suggest that windowing can be looked upon as a form of partial response signaling (PRS) along frequency with coefficients $c_1$. The Hanning window can be effectively viewed as a class V PRS response. An important difference between conventional PRS and receiver windowing as in the present invention is that the PRS function is carried out at the transmitter while windowing according to the invention is carried out at the receiver-end including the effect of channel attenuation coefficients and additive noise.

This suggests the structure of FIG. 2 for Frequency-domain windowing (FDW) using equation (2.4). This formulation is significantly more computationally efficient when the window-DFT response has only a few non-zero coefficients ($c_l$). For windows which do not display nulls at the bin center-frequencies (like the DPS window depicted in FIG. 3), the number of equalizer taps is determined by assuming a threshold below which the IBI need not be compensated as it falls below the ambient noise floor. The operation of the decision feed back equalizer (DFE) is now described for its two stages of operation, namely training and normal operation.

Training is a two stage-process:

1. First only DP1 is active for a duration of, say, 512 symbols. This stage corresponds to the REVERB signal specified in T1.413 ADSL training sequence. During this time, the FEQ coefficients for each bin are estimated by conventional procedures. Let the FEQ coefficients be denoted by $f_i$ where $$f_i = \frac{1}{\bar{\alpha}_i} \quad (2.6)$$

and $\bar{\alpha}_i$ denotes the estimate of $\alpha_i$ obtained after the FEQ training period. After FEQ training, the equalized sub-symbols provided as an output from DP1 are given by $$\hat{a}_i = f_i \hat{a}_i = f_i \alpha_i a_i + f_i u_i \quad (2.7)$$

2. The IBI contribution from the lth bin into the ith bin is characterized by the IBI coefficients $\alpha_l c_{l-i}$. These interfering terms can be cancelled by feeding back sub-symbols which have already been decoded. Thus, assume that decisions are fed back from the "right", i.e. the equalization of bin k utilizes decisions made upon bin k+1, bin k+2 and so on. The same procedure may be carried out using decisions from the "left". In the rest of this specification, only right-feedback is shown for convenience. Assuming L feedback taps, (L+1)×1 DFE weight vector for the ith bin in DP2, wi, is given as $$W_i = f_i[1, \ldots, -C_L]^T \quad (2.8)$$

where $c_i$ are the window IBI coefficients obtained from equation (2.3). This solution for $w_i$ is directly obtained after training step 1 and does not require any additional training symbols. The coefficients $c_l$ for l<0 are merely shifted to the right such that the reference sub-symbol (sub-symbol at output of equalizer) is multiplied by $c_0$. For example, a frequency shifted version of the Hanning window has coefficients $c_0 = -0.5$, $c_1 = 1$ and $c_2 = -0.5$. Normalizing the main tap to unity, this becomes $c_0 = 1$, $c_1 = -2$ and $C_2 = 1$ for use by the DFE. The above DFE coefficients are used in conjunction with the input vectors $x_i^{right}$ given as $$x_i^{right} = [\hat{b}_i, \ldots, \check{\alpha}_{i+L} \check{a}_{i+L}]^T \quad (2.9)$$

where $\check{a}_i$ denotes decision-feedback sub-symbol values. Similar expression holds for $x_i^{left}$ if feedback decisions from the left are used. After the DFE coefficients have been initialized, equalized sub-symbols provided as an output from DP2 are given by $$\hat{b}_i = w_i^T x_i^{right} \quad (2.10)$$

$$= f_i \alpha_i a_i + f_i v_i + \sum_{l=1}^{L} f_i c_l (\alpha_{i+l} a_{i+l} - \check{\alpha}_{i+l} \check{a}_{i+l})$$

The last term arises from any discrepancies in channel estimation and feedback decision errors. In comparison, the output of DP1 is given by equation (2.7) above.

Figure 4:
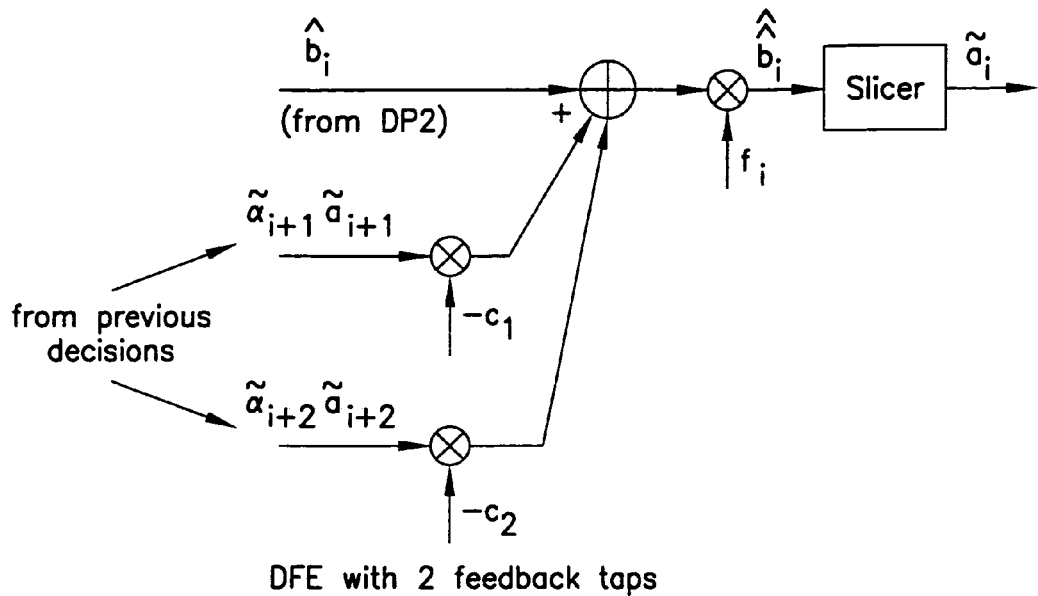
FIG. 4 shows the decision feedback equalizer (DFE) with two feedback taps.

FIG. 4 depicts the above described DFE structure with L=2 feedback taps. This structure bears similarity with DFE structures used in a classical PRS system. This is not surprising because of the basic mathematical similarity in terms of time-frequency duality in the two approaches, notwithstanding the different motivations behind these techniques. Single-carrier PRS equalizers/detectors operate in the time-domain with symbol-spaced taps while the DFE here operates in the frequency-domain with bin-spaced taps. A key difference is that the effect of the channel ($\alpha_i$) is taken into account in the DFE here while this is not an issue in PRS equalizers.

Figure 5:
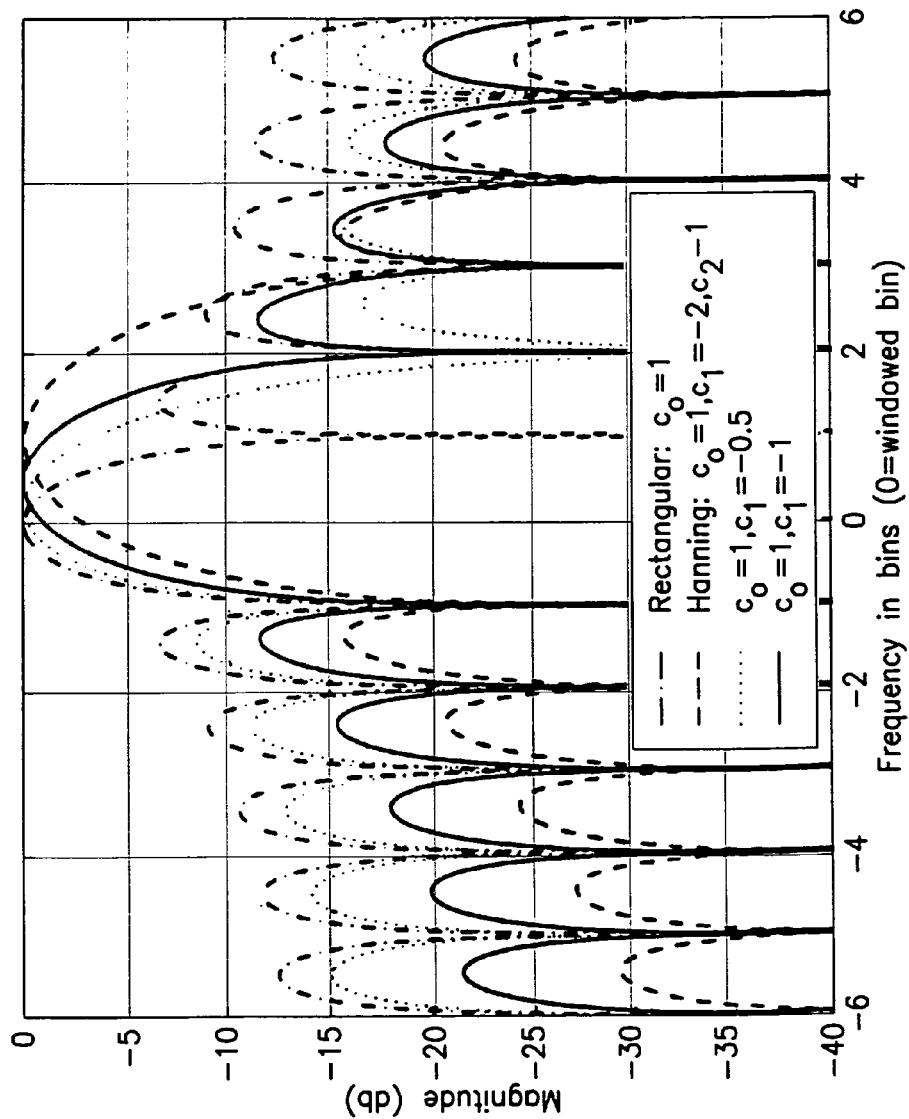
FIG. 5 shows different frequency domain windowing magnitude responses.

FIG. 5 plots four different FDW window responses—Rectangular (only $c_0 = 1$), Hanning ($c_0 = 1$, $c_1 = -2$, $c_2 = 1$), Asymmetric FDW with non-zero coefficients ($c_0 = 1$, $c_1 = -0.5$) and with coefficients ($c_0 = 1$, $c_1 = -1$). There are, of course, a variety of other windows that may be used as well. It is seen that among the above windows the Hanning window displays the best side-lobe suppression. However, it also requires 2 feedback taps and has the largest SNR degradation in white noise of $10 \log_{10} 6 = 7.78$ dB. In comparison, the last two windows have higher side-lobes but require only a single feedback tap and have white noise SNR degradations of $10 \log_{10} 1.25 = 0.97$ dB and $10 \log_{10} 2 = 3$ dB respectively.

An alternate implementation of FDW can also be equivalently carried out after the FEQ stage in DP1, i.e., as $$\hat{b}_i = \sum_{l=1}^{L} \hat{a}_{i+l} c_l \text{ and } v_i = \sum_{l=1}^{L} f_{i+l} u_{i+1} c_l \quad (2.11)$$

Figure 5A:
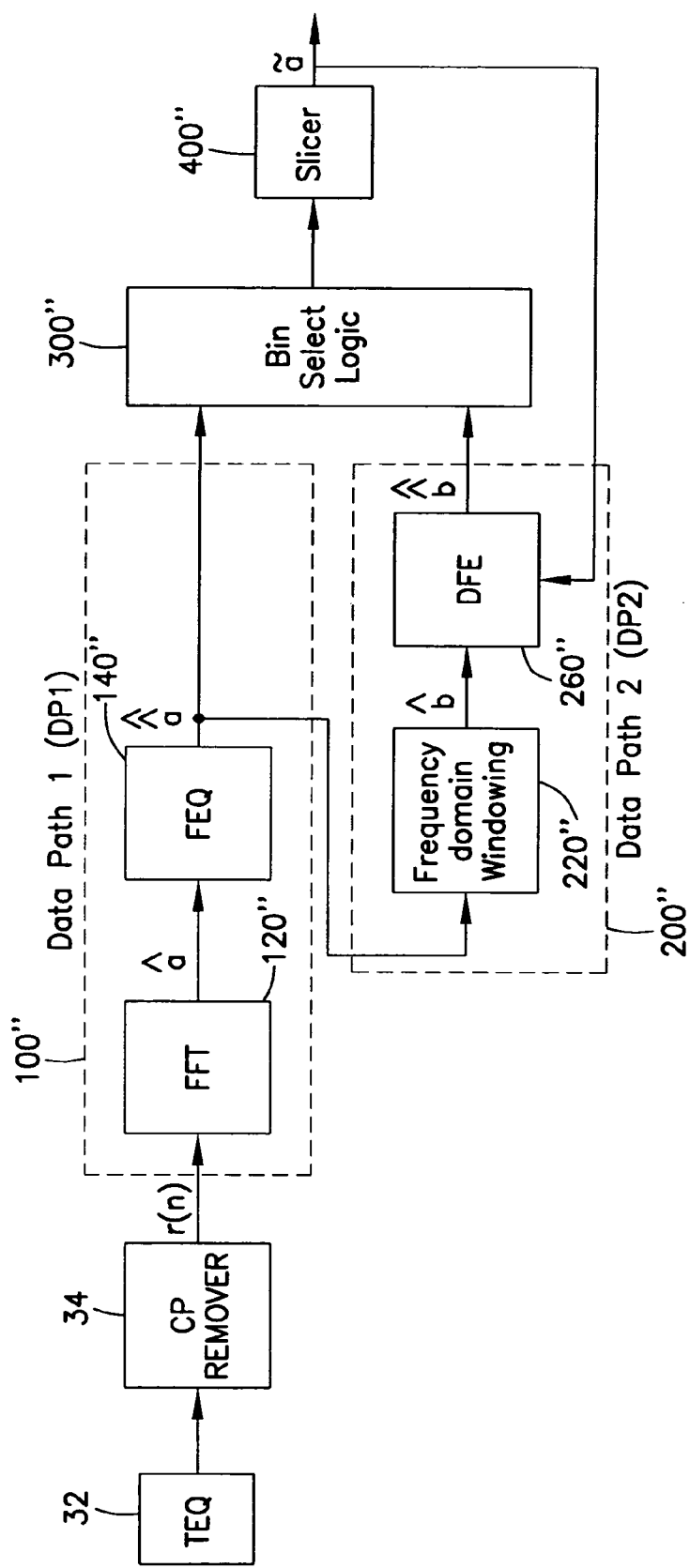
FIG. 5A shows an alternate demodulator using FDW.

See FIG. 5A. FIG. 5A shows the alternative demodulator architecture with frequency domain windowing. Following the TEQ 32 and CP remover stage 34, the output of the CP remover 34 is provided to Fast Fourier Transform 120". The output of the FFT 120" in first data path 100" is provided to the frequency domain equalizer (FEQ) 140". The output of the FEQ 140" represent the equalized subsymbols â. The equalized subsymbols a are provided to the bin select logic stage 300" whose output is provided to the slicer 400". The equalized subsymbols â are also provided into the second data path 200" comprising the frequency domain window stage 220" and the decision feedback equalizer (DFE) 260". The equalized subsymbols b̂ output from the DFE 260" are provided to the bin select logic 300". As in the other embodiments, the bin select logic selects the output from either the first path 100" or the second path 200" depending upon set criterion, e.g., which path produces more data bits per symbol or has a higher SNR. As in the other embodiments, the output from the slicer 400" is provided in a feedback path to the DFE 260" to cancel interference created by the frequency domain window stage 220".

Using equation (2.11) instead of (2.4), the corresponding DFE and input vectors from the embodiment of FIG. 5A are given as $$W_i = [1, \ldots, -C_L]^T$$

$$x_i^{right} = [\hat{b}_i, \ldots, \check{a}_{i+L}]^T \quad (2.12)$$

Thus, using $w_i$ and $x_i^{right}$ from equation (2.12) above instead of equations (2.8) and (2.9), the equalized sub-symbols output from DP2 in the embodiment of FIG. 5A are given by $$\hat{b} = f_i \alpha_i a_i + \sum_{l=0}^{L} c_l f_{i+l} u_{i+l} + \sum_{l=1}^{L} c_l (f_{i+l} \alpha_{i+l} a_{i+l} - \check{a}_{i+l}) \quad (2.13)$$

Minor differences can be observed in the additive noise terms in equations (2.10) and (2.13). Instead of each post-FFT noise sample ($u_{i+1}$) for the ith bin being weighted by $f_i$, each is weighted by the corresponding FEQ coefficient ($f_{i+1}$). The resulting difference in the corresponding noise variances will be pronounced only if there are large differences between the channel attenuation coefficients over the DFE span. It is conceivable that this alternate FDW and DFE structure may be preferable in some implementations. This alternate DFE structure is applicable only to FDW while the previous DFE structure is applicable to both TDW as well as FDW and is used in the rest of this specification.

During normal operation, ă elements in $\ă_i^{right}$ (or $x_i^{left}$) are obtained as reconstructed sub-symbol values obtained from the slicer. Care must be taken to normalize the slicer 400, 400', 400" output by taking the ADSL gain scaling factors and constellation energy normalization scaling factors into account before substituting them back into $x_i$. The bin-select logic 300, 300', 300" (FIGS. 1, 2 and 5A) determines the data-path (DP1 or DP2) used to provide the slicer input for any given sub-symbol. (FIG. 4 shows slicer operating on $\b_i$). The bin-select logic may select all sub-symbols from DP1 only (i.e., no windowing is used), all from DP2 only, or select from DP1 or DP2 on a bin by bin basis. For example, in a simulation described below, a simple number of bits in a given bin is used. Once a SNR-per-bin profile is computed for DP1 and DP2, the bit-loading algorithm is run twice—once on each profile from DP1 and DP2. This ensures that the basic bit-loading algorithm being used need not be modified and that the combined bit-allocation is no worse than a conventional receiver having path DP1 only.

A symbol-rate LMS update of FEQ (and thus, the DFE) weights can be carried out to track variations in the channel impulse response (CIR) and interference. Sub-rate adaptation may also be used for economy of implementation. Normalized LMS is preferred over regular LMS to make the adaptation speed impervious to the dynamic range of the input data for all bins.

For DP1, the probability of symbol error per dimension for $M^2$-ary QAM (Quadrature Amplitude Modulation) with AWGN is given by $$P_e = 1 - \left[1 - \left(1 - \frac{1}{M}\right) Prob(|u_i| > \frac{d_{min,i}}{2})\right]^2 \quad (2.14)$$

$$\approx 4\left(1 - \frac{1}{M}\right) Q\left(\frac{d_{min,i}}{2\sigma_U}\right)$$

where the Q-function is defined as $$Q(x) = \frac{1}{\sqrt{2\pi}} \int_x^\infty \exp\left(-\frac{x^2}{2}\right) dx \quad (2.14(a))$$

and $d_{min,i} = \|\alpha_i\| d$ denotes the minimum distance between QAM constellation points at the channel output and d equals the distance between uncoded input QAM constellation points. For ADSL systems, the probability of symbol error per dimension (Pe/2) is generally specified (1e–7 for ADSL/ADSL-Lite). Similarly, for DP2, using equations (2.10) and (2.14), $$P_{e,DFE} \approx 2\left(1 - \frac{1}{M}\right) Prob\left(\left|v_i + \sum_{l=1}^{L} c_l(\alpha_{i+l} a_{i+l} - \tilde{\alpha}_{i+l}\tilde{a}_{i+l})\right| > \frac{d_{min,i}}{2}\right) \quad (2.15)$$

This expression is highly intractable to evaluate for general cases when there are feedback decision errors. If error propagation is ignored and $\alpha_i$ estimates are exact, equation (2.15) reduces to equation (2.14) with $\sigma_u$ replaced by $\sigma_v$. Clearly, DFE performance will be degraded by feedback errors and it is important to take its effect into account in devising the overall equalization structure. Any errors are also likely to propagate through multiple bins because of the typically large values of feedback coefficients and increase the BER (bit error rate) from the specified value. However, owing to symbol-by-symbol detection in DMT, propagating errors are always confined to the same DMT symbol. Note that for a given SNR, $P_{e,DFE}$ is increased compared to $P_e$ due to possible error propagation in addition to any differences between $\sigma_u$ and $\sigma_v$ (which can additionally increase/decrease this difference). For the case of AWGN only, $\sigma_v^2 \geq \sigma_u^2$ (equation 2.5) and $P_e$ can be looked upon as a lower bound on $P_{e,DFE}$.

It is known that error propagation increases the probability of symbol error by at most a factor of ML where L is the number of feedback taps and when all symbols (symbol being equalized and feedback symbols) are M-ary PAM (Phase Amplitude Modulation). For example, letting $P_{e,DFE} < K_{ep} P_e$, for a DFE with 1 feedback tap and 256QAM (M=16), $K_{ep}=16$. For a Hanning window with 2 feedback taps, $K_{ep}=256$. This expression also holds approximately for $M^2$-ary QAM above when the $c_l$ coefficients are real resulting in IBI that is only between in-phase samples and only between quadrature samples. If the $c_l$ are complex (for real asymmetric windows), there will be crosstalk between in-phase and quadrature samples and the above upper bound will be optimistic.

The upper bound increases exponentially with the number of feedback taps. In general, the BER increases are large when there are multiple feedback coefficients (large L), the feedback coefficients have relatively large values ($c_l/c_0$ ratios are not small) and when multiple bits are loaded per sub-symbol (large M). There are some important differences between the problem at hand and the underlying assumptions of the above results. First, adjacent sub-symbols in DMT can belong to different sized constellations, i.e. different values of M for adjacent (feedback) bins. This further complicates a potential analytical solution for equation (2.15). Second, DMT symbols enjoy the benefit of deterministic pilot sub-symbols each symbol time, e.g. bin 64 downstream and bin 16 upstream in T1.413). This puts a hard-limit on the extent of a single error propagation event. Finally, the upper bound above holds for AWGN only which is not the case of primary interest since windowing is useful only for cases with crosstalk and/or NBI. Nevertheless, the upper bound provides a valuable indicator for the performance degradation that can be expected.

The use of preceding to counter error propagation is well known in the literature. However, for the problem at hand, this approach suffers from some drawbacks. First, it requires participation of the transmitter. This precludes an independent application of the overall technique unless standardization considerations are met. Second, precoding does not necessarily provide immunity against error propagation depending on the constellation size and feedback coefficients. In fact, it has been shown to even marginally degrade performance for some cases. Third, the precoder is likely to be far more complex than the conventional precoders used in PRS systems. This is because the effect of channel coefficients and unequal QAM constellations in adjacent feedback bins has to be explicitly taken into account.

An alternative (non-precoding, receiver-only) two-fold solution to this problem is to:
(A) Provide an additional SNR Margin while doing bit-loading according to the achieved SNR in DP2 during training. In other words, the bit-allocation can be done for a BER which absorbs the effect of $K_{ep}$. For example, bit-allocation in DP2 may be chosen to compensate for $K_{ep}$=100 (or more) by setting the target BER to be 1e–9 instead of 1e–7 with the 4 dB margin unchanged. Bit-allocation according to a lower target BER is equivalent to a "DFE SNR penalty" which can be calculated from BER versus SNR curves for QAM. For QAM sub-symbols and AWGN, the SNR penalty is 1.14 dB for this case (SNR penalty for 1e-10 BER specification is 1.62 dB).

(B) Periodic Pseudo-Pilots can be established to reduce the threat of runaway errors within a symbol. A pseudo-pilot is defined as a bin which is provided an additional SNR margin, of say 3 dB (roughly equivalent to a reduction in 1 bit) to significantly reduce the probability of incurring an error and is demodulated using DP1. Pseudo-pilots can be established in several ways, such as periodically (such as every 32nd bin) or within groups of bins being decoded using DP2 (after bin-selection logic is done). Pseudo-pilots "reset" the decision feedback process while sequentially equalizing sub-symbols using the DFE. It would also permit equalization of groups of bins in parallel if desired, where each group is equalized sequentially using its pseudo-pilot as the reference starting sub-symbol. If 2 or more feedback taps are used, the number of pseudo-pilots required also increases proportionally, e.g. pairs of adjacent pseudo-pilots are required for a Hanning window requiring 2 feedback decisions.

These measures will reduce the aggregate data rate that can be achieved by the use of windowing. It is also preferable to minimize the number of feedback coefficients since it reduces computation as well as the risk of error propagation (or reduced SNR penalty).

Figure 6:
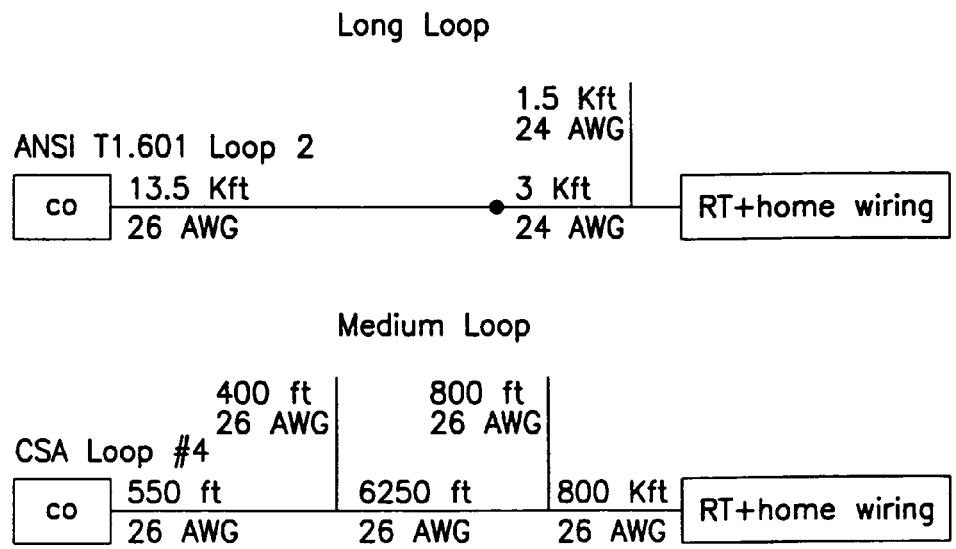
FIG. 6 shows long and medium length loops.

Test cases are presented in FIGS. 7–13 for downstream transmission. FIG. 6 depicts the two example loops used for the plots. The first loop (ANSI T1.601 loop 2) is 16.5 Kft with one bridge tap. The second loop (CSA Loop 4) is a medium length 7.6 Kft loop with 2 bridge taps. The NBI is generated simply by a tonal interferer (cosine) whose angular frequency $w_c$ randomly changes every 100 DMT symbols for $b \in [b_c-1, b_c+1]$ where $Wb=2\pi b/2N$ and $b_c$=50 for Figure pairs 7, 8 and 9, 10. Downstream parameters are N=256, G=32, fs=2.208 MHz channel shortening TEQ algorithm with channel estimation was used in all cases to shorten the CIR except in FIG. 13. Channel estimation was performed using impulse trains in the presence of the impairments such as crosstalk or NBI. With 544 samples/symbol, the 10-tap FIR TEQ filter requires 5,440 real multiplications and 4896 real additions per DMT symbol time.

A 2-tap FDW (Window 1) and a 3-tap Hanning window (Window 2) are used for all cases shown with bin 64 (pilot) as the reference bin. For the Hanning window, bin 63 is also used as a reference to initiate the equalization process. For bin indices greater than 64, the DFE input vector is $x_i^{right}$ while $x_i^{left}$ is used for the others. The window feedback coefficients are appropriately chosen. For example, for Window 1, the coefficients are $c_0$=1, $c_1$=–1 for bin index greater than 64 and $c_0$=1, $c_1$=–1 for bin index less than 64. Similarly, for window 2, the coefficients are $c_0$=1, $c_{+1}$=–2, $c_{+2}$=1 for bin index greater than 64 and $c_0$=1, $c_{-1}$=–2, $c_{-2}$=1 for bin index less than 64. Window 1 is seen to provide a good trade-off between having fewer feedback taps, good sidelobe suppression and low SNR degradation in white noise. The spikes seen in the bit-allocation plots at bin 64 are due to the pilot bin which is always modulated with a constant 2-bit sub-symbol. For comparison, the SNR is also plotted for a symmetric Hanning window ($c_0$=1, $c_{-1}$=–0.5, $c_1$=–0.5)

with only alternate bins active. To achieve this, the gain-scaling factor on alternate bins is set to zero at the transmitter. This ensures that there is no IBI between adjacent bins and only a single-tap FEQ (as in DP1) is required. This, of course, also reduces the number of active bins by half but can serve as a good indication of what is potentially achievable through windowing.

For these cases, the signal and noise (crosstalk or NBI) PSD's are plotted before and after the channel shortening TEQ. AWGN of PSD–140 dBm/Hz is added to the crosstalk and NBI for all cases. It can be seen that the TEQ alters the spectrum of the signal and noise at the input of DP1 and DP2 and thus influences the performance of the rest of the receiver. The achieved SNR per bin is plotted for the conventional method (identical to DP1) and with windowing (DP2). The resulting bit-loading tables depict the resulting bit loading profiles for 1e-7 BER with 4 dB margin for DP1 and using Window 1 (bit-loading arising from Window 2 is not plotted). Bit-loading for DP2 also includes an additional SNR margin of 1.14 dB as described above. The bin-select logic for selecting DP1 or DP2 for any given bin is simply to select the path which yields higher bits per bin after bit-loading is complete. In case of a tie, DP1 is chosen. The combined (maximum) bit allocation is marked by "circles".

TABLE A

Example cases plotted in FIGS. 7–13.

| FIGURE | Loop | Crosstalk | NBI | TEQ |
|---|---|---|---|---|
| 7, 8 | Long | — | Yes | Yes |
| 9, 10 | Medium | — | Yes | Yes |
| 11, 12 | Medium | 10 ADSL-US | — | Yes |
| 13 | Medium | 10 ADSL-US | — | — |

Figure 7A:
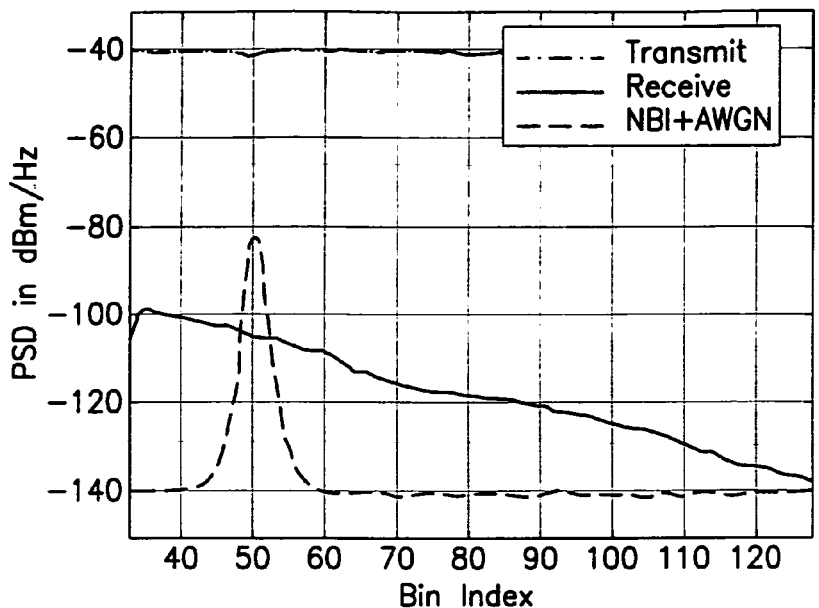
FIG. 7 shows a long loop with NBI: (A) signal and noise power spectral densities (PSDs) before TEQ and (B) after TEQ.
Figure 7B:
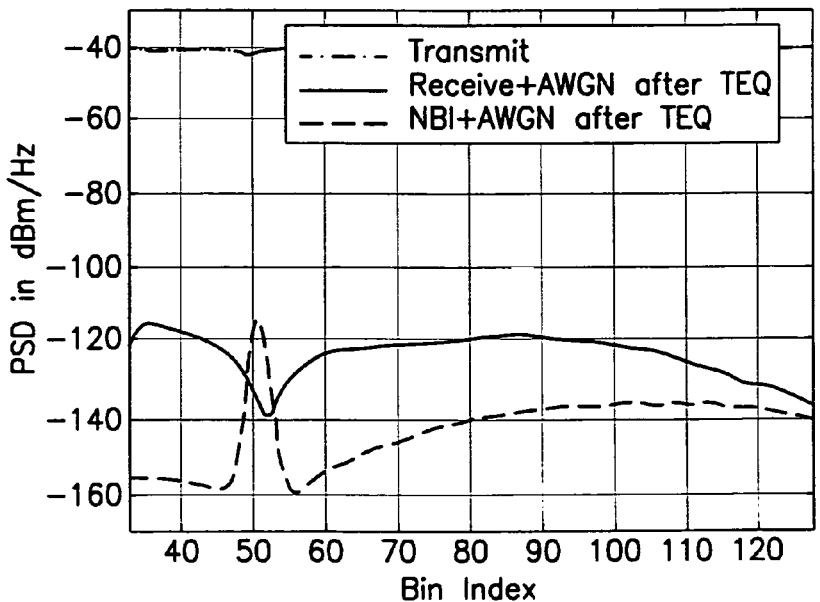
Figure 8A:
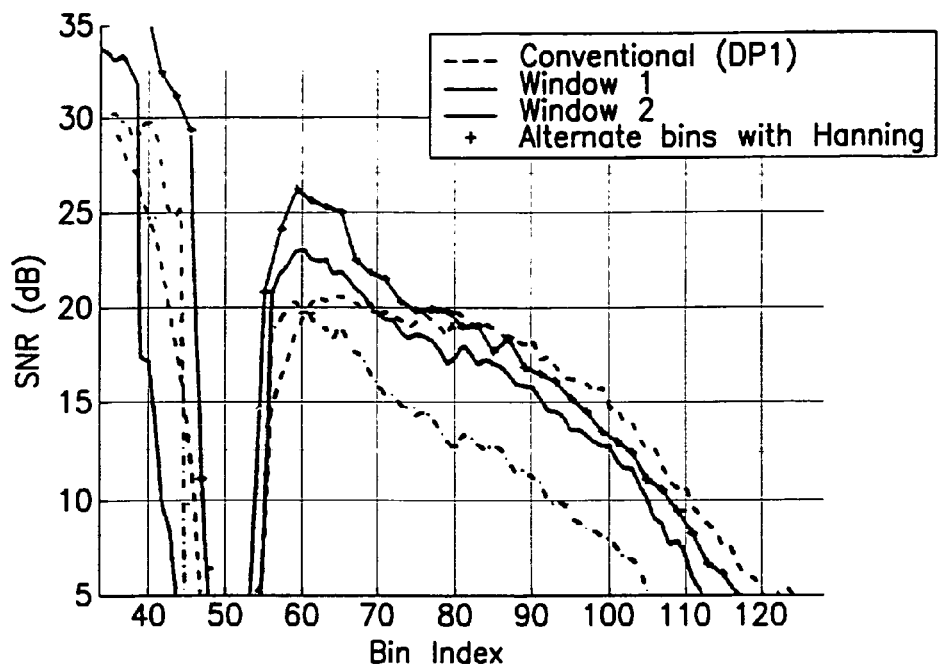
FIG. 8 shows a long loop with NBI: (A) SNR profile and (B) bit allocation profile.
Figure 8B:
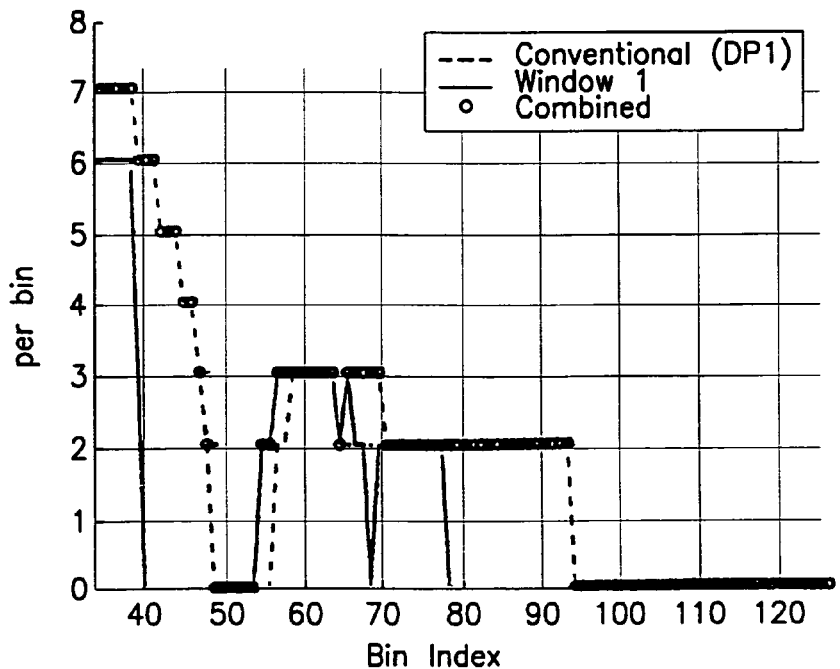
Figure 9A:
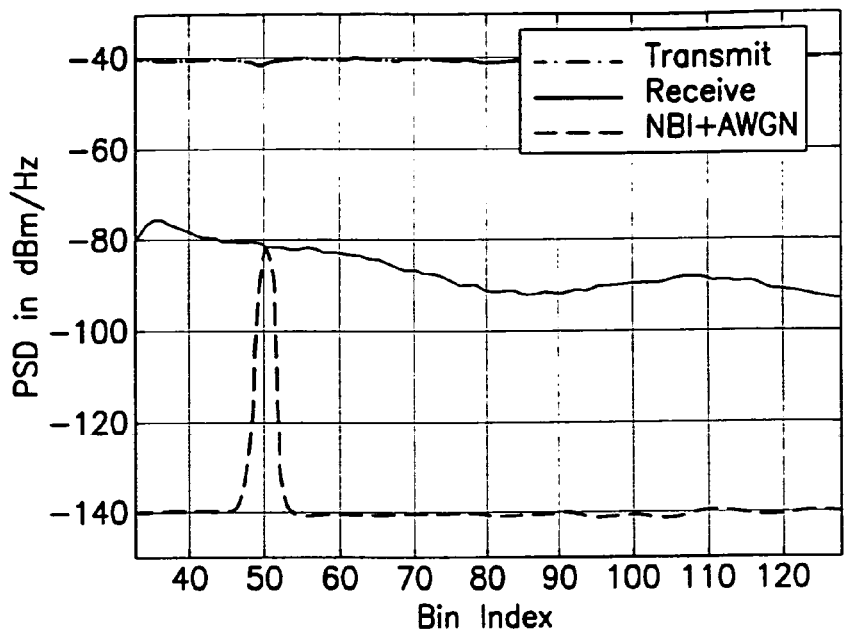
FIG. 9 shows a medium loop with NBI: (A) signal and noise power spectral densities before TEQ and (B) after TEQ.
Figure 9B:
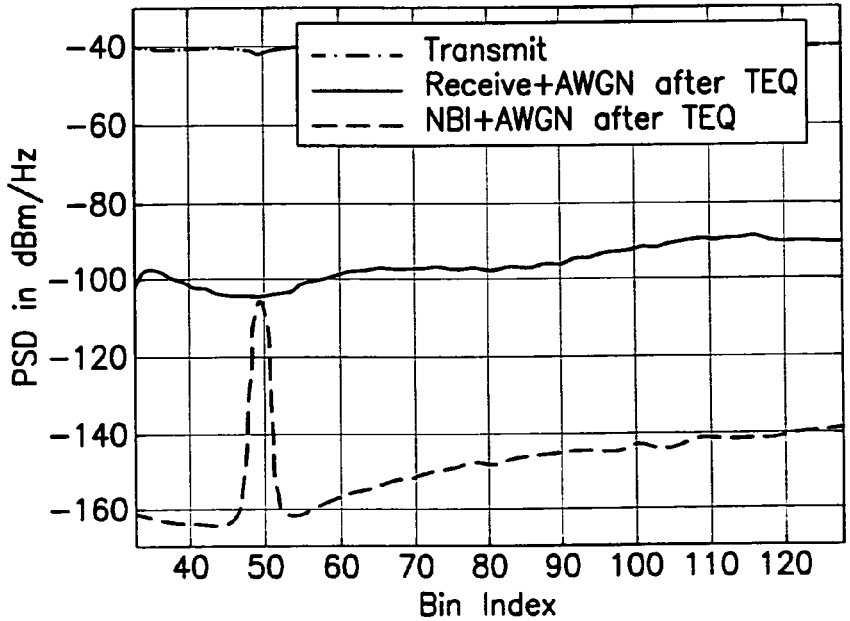
Figure 10A:
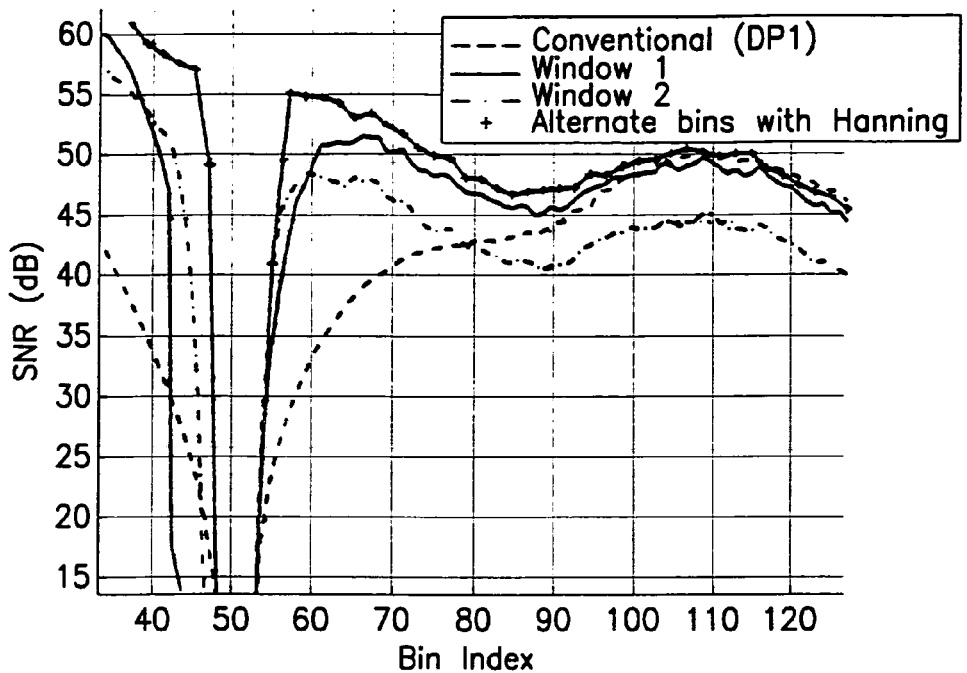
FIG. 10 shows a medium loop with NBI: (A) SNR profile and (B) bit allocation profile.
Figure 10B:
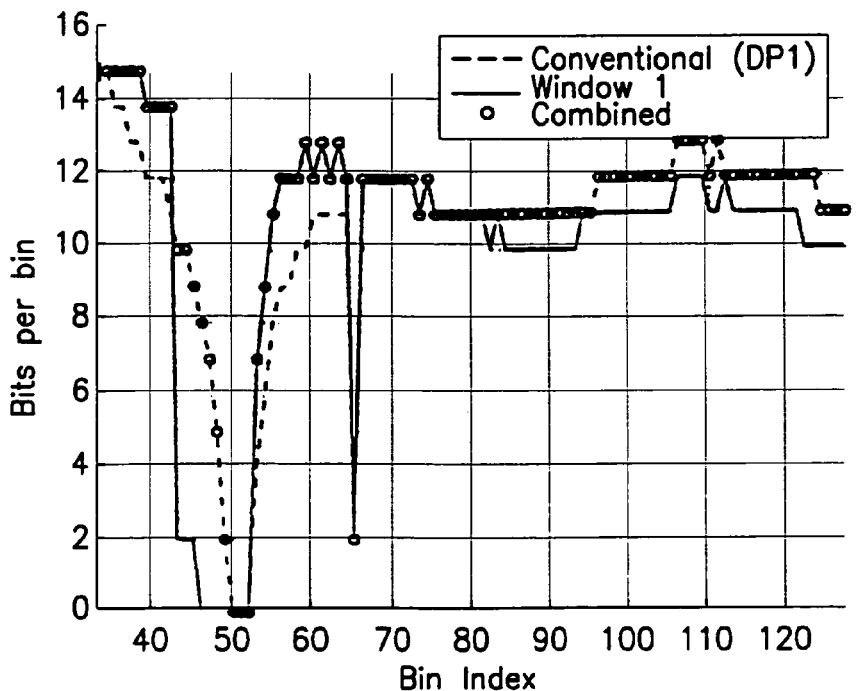

FIGS. 7 and 8 show that the DFE provides the most gain in the vicinity of the NBI. Window 2 performs better than Window 1 in the immediate vicinity of the NBI but incurs a greater loss in the rest of the band. The effect of NBI monotonically reduces with frequency separation. Thus, bins spaced further in frequency are less affected and the performance advantage of windowing gradually reduces until it approaches the white-noise loss of 3 dB for Window 1. FIGS. 9 and 10 display similar performance for the medium loop. It is notable that performance gains are dependent on the strength of the NBI relative to the ambient SNR determined by the received signal power after passing through the channel and the AWGN floor. In FIG. 9, the effect of the NBI is more pronounced compared to FIG. 7 because the ambient SNR is higher. Thus, NBI suppression is more effective and greater gains are obtained via windowing.

Figure 11A:
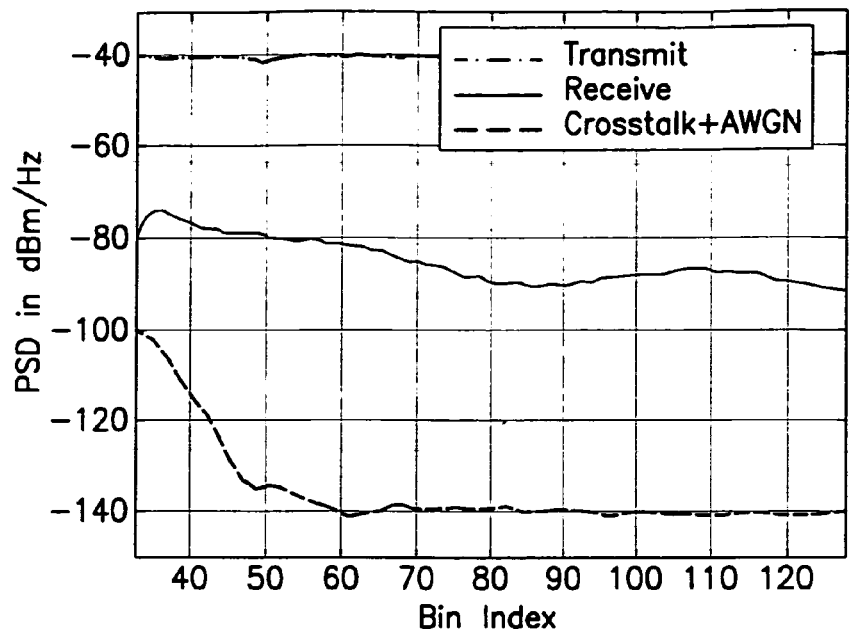
FIG. 11 shows a medium loop with cross-talk: (A) signal and noise power spectral densities before TEQ and (B) after TEQ.
Figure 11B:
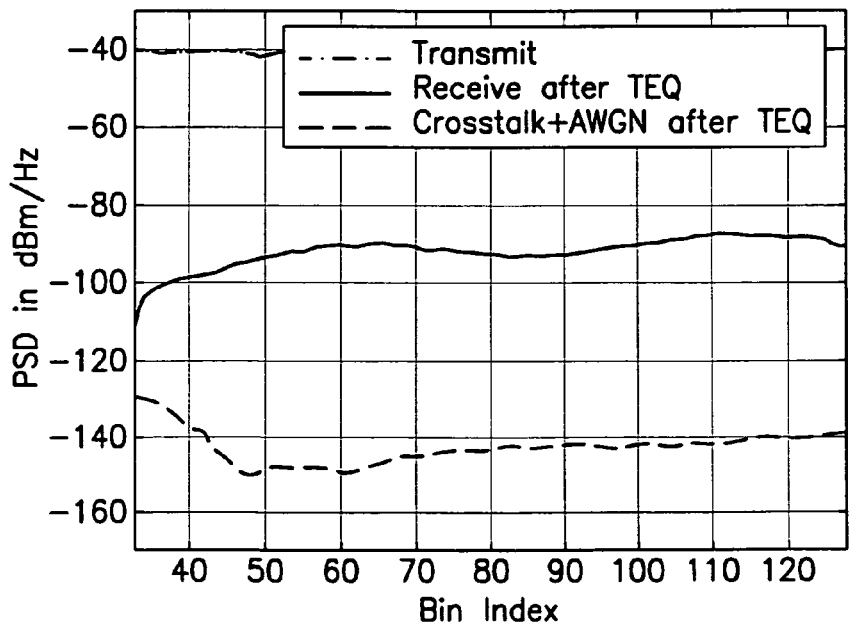
Figure 12A:
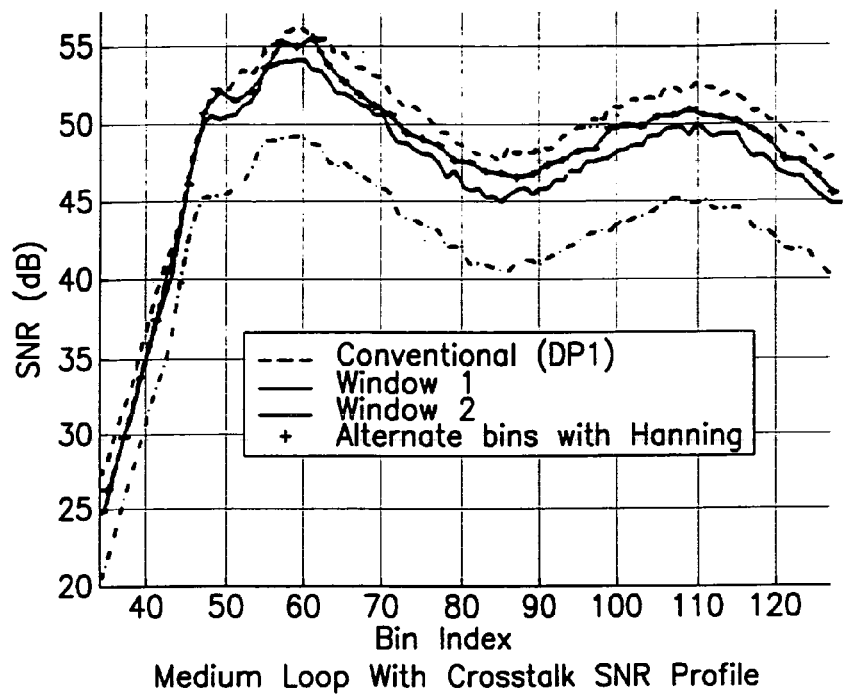
FIG. 12 shows a medium loop with cross-talk: (A) SNR profile and (B) bit allocation profile.
Figure 12B:
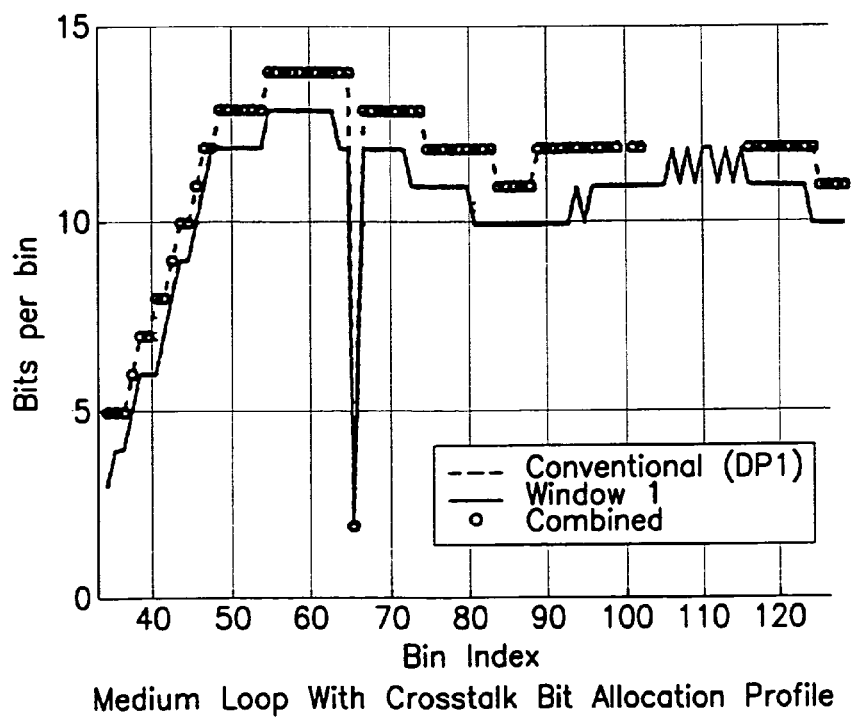
Figure 13A:
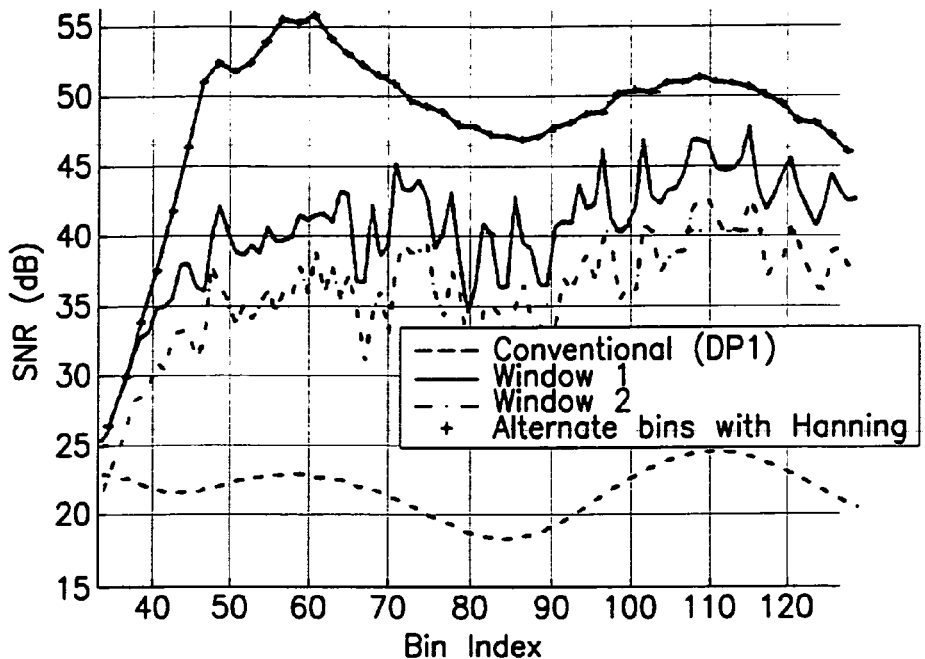
FIG. 13 shows a medium loop with cross-talk without TEQ: (A) SNR profile and (B) bit allocation profile.
Figure 13B:
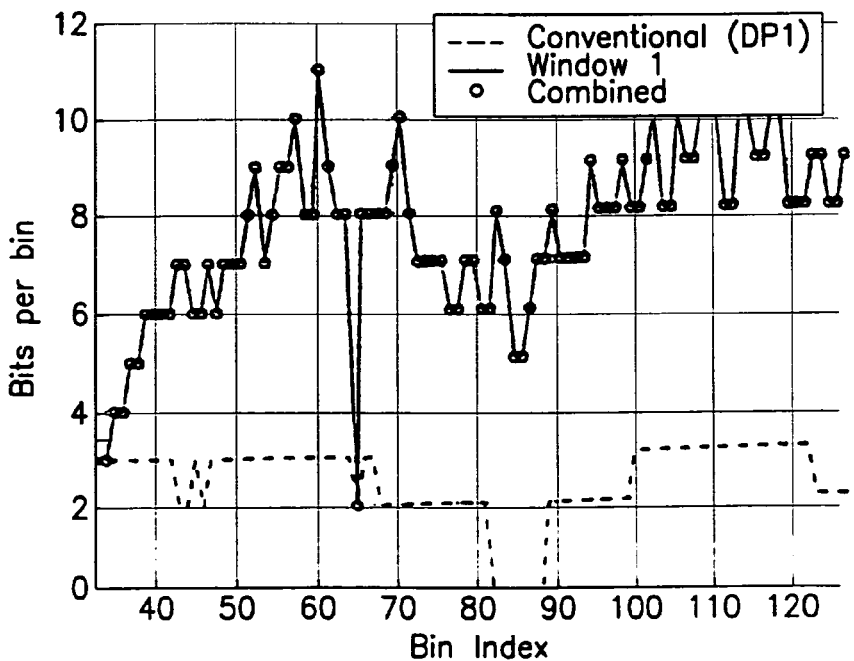

FIGS. 11 and 12 show that the DFE provides no advantage in the presence of crosstalk which is not strongly colored after the TEQ (Time Domain Equalizer). In fact, in the latter portion of the spectrum where the noise is mainly spectrally flat white, Windows 1 and 2 lose about 3 dB and 8 dB respectively compared to DP1 as expected. FIG. 13 is an example of the dramatic improvement that can be obtained by superior spectral confinement. This case is the same as FIG. 11(A) above except that no TEQ is used. Thus, the CIR is not confined to the CP resulting in additional noise due to IBI and ISI (Inter Symbol Interference). Since the per-bin SNR due to AWGN and crosstalk is relatively much higher, the effect of IBI+ISI is isolated. Thus, the achieved SNR per bin in DP1 (solid curve) essentially represents the noise floor due to channel induced IBI+ISI.

Windowing with subsequent use of DFE substantially improves the per-bin SNR in this case resulting in an approximately three-fold increase in the aggregate data rate. Similar results have been obtained for other loops as well. In cases when the TEQ is present, but does not adequately shorten the CIR, corresponding performance gains are obtained. Imperfect symbol alignment and timing jitter also lead to diminished orthogonality between bins and can benefit from this approach. Preliminary results also suggest that the invention can provide some additional margin against local transmitter echo (which can effectively appear as a strong spectrally colored cross-talker). Similar to the situation with NBI, an overall SNR enhancement in any particular situation depends on the relative levels of the ambient SNR due to additive noise and the IBI+ISI noise due to imperfect channel shortening. Since only the IBI+ISI component is suppressed via windowing, significant (if any) improvement will be obtained only when the ambient SNR is relatively higher.

The extra computation in DP2 arises from two main things—windowing and the DFE. Table B shows these requirements for Window 1 for downstream (at ATU-R) and upstream (at ATU-C) channels in terms of multiplications and additions required per DMT symbol (Aggregate symbol rate is 4 KHz in ADSL standards). The assumed parameters are:

(A) Downstream: N=256 or 128, ATU-R performs 2N point FFTs, 95 bins active (33–127).

(B) Upstream: N=32, ATU-C performs 64 point FFTs, 26 bins active (6–31).

(C) FDW: complex additions and L+1 complex multiplications with the channel coefficients. (assuming window coefficients can be implemented as binary shift operations).

(D) DFE: L complex additions and (L+1) complex multiplications per symbol.

TABLE B

Additional real (multiplications, additions) per DMT symbol with 2-tap FDW and DFE (FIG. 4 (B)).

| Location | FDW | DFE |
| --- | --- | --- |
| ATU-R (N = 128 or 256) | 0, 380 | 760,190 |
| ATU-C (N = 32) | 0, 104 | 208,52 |

The TDW operation requires 2N real multiplications when a 2N-pt FFT is used while the DFE complexity is the same as above. However, most of the additional complexity lies in doing an extra FFT. Optimized implementations of FFT's often incur fewer multiplications/additions than shown above by exploiting the fact that the input is purely real and only the first N outputs are required (output is conjugate symmetric).

While TDW and FDW are equivalent, there can be a significant difference in computational load. All windows with real coefficients result in equal TDW complexity. On the other hand, the computational load in FDW depends on the number of feedback coefficients, i.e. on the particular FDW frequency response. Also, FDW is independent of the preceding FFT size and can be carried out on a bin-by-bin basis as required. Provision for implementing multiple windows can be done by making the number of FDW coefficients and their values programmable. Furthermore, different bins can have different windows applied to them (in the same symbol) if desired, (including no windowing). In the case of TDW, the window coefficients can be programmable as well and FFT blocks used in other algorithms (such as for the TEQ or for PAR (Peak-to-Average Ratio) reduction) may be available for reuse. Alternative embodiments of TDW can potentially be used to reduce the implementation complexity in terms of hardware and/or required instructions. For instance, the two FFT's in FIG. 1 can be executed by the same hardware/firmware block in a sequential fashion (staggered in time) instead of being done simultaneously by two different blocks.

Among different windows, 2-tap FDWs (1 feedback tap) are well-suited since they provide a good balance between side-lobe suppression and complexity. Windows with multiple feedback taps suffer from the drawbacks of increased risk of error propagation, need for greater number of reference sub-symbols and greater DFE computation. Also, depending on the feedback tap values, the SNR degradation in white noise only is also greater. For example, the window with coefficients $c_0=1$, $c_1=-1$ loses 3 dB in white noise while the Hanning window ($c_0=1$, $c_1=-2$, $C_2=1$) loses 7.78 dB. In general, this implies that to obtain noise suppression benefits, the interference has to have much stronger correlation and thus is well suited only for a limited number of cases. DPS windows are a class of windows which can be tailored for different side-lobe suppression versus main-lobe width trade-off at the expense of greater number of DFE taps (FIG. 3) and can be used in some situations.

The FEQ and DFE can adapt to NBI and/or crosstalk if it emerges sufficiently slowly relative to the tracking capabilities of the LMS (Least Mean Squares) algorithm and change the bit-allocation via bit-swaps. More elaborate and potentially faster tracking RLS (Recursive Least Squares) algorithms may also be used. If a strong interferer appears suddenly, the modem may fall back into fast retrain (in ADSL-Lite) or even a full restart. In any case, the sustainable data rate (or SNR margin) after the incident is likely to be better, or equivalently require fewer bit-swaps.

There is a trade off between greater loop reach, SNR Margin or data-rate. This follows from the fact that, depending on the operative constraints, a higher achievable SNR in bins is equivalent to (A) Greater loop reach for a given minimum margin and data rate or (B) Higher SNR margin in active data carrying bins for a given data-rate and loop reach or (C) Greater data-rate for a given reach and margin. Gains in SNR using the invention are not unconditional, i.e., gains may be realized only in the presence of NBI, highly correlated crosstalk, or other imperfections such as inadequate channel shortening, symbol alignment offsets and jitter.

Discounting minor changes, the overall technique is likely to be applicable to other DMT based modems such as VDSL and wireless OFDM as well. NBI and other impairments discussed above are known to afflict wireless and VDSL systems also, perhaps even more so. These modems uses a transmitter PMD (Physical Media Dependent) structure largely similar to that in ADSL modems considered above. Moreover, since transmitter participation is not required for this technique, most standard-compatibility related issues are rendered irrelevant.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. A receiver providing a demodulated output including a demodulated digital bit stream from a received discrete multi-tone modulated input signal, the input signal received from a communication channel having noise thereon, the input signal having modulated thereon a digital bit stream, the receiver comprising:

first and second data paths coupled to receive the input signal;

the first of the two data paths comprising a first stage having a frequency response for applying a discrete Fourier Transform to the input signal and further comprising a frequency domain equalizer having an input coupled to an output of the first stage;

the second of the two data paths comprising a window stage for suppressing side lobes of the frequency response of the first stage; and a logic stage for selecting an output from the first data path or the second data path based on a predefined test and for providing a selected output representing the demodulated digital bit stream.

2. The receiver of claim 1, further comprising a decision feedback equalizer in said second data path having as an input an output from said window stage and for cancelling inter-bin interference created by said window stage.

3. The receiver of claim 2, wherein the decision feedback equalizer receives a feedback signal from an output of said logic stage to cancel the inter-bin interference.

4. The receiver of claim 3, further comprising a slicer stage having as an input the output of said logic stage and providing as an output the demodulated digital bit stream; said demodulated digital bit stream being provided as said feedback signal.

5. The receiver of claim 1, wherein said window stage in the second data path comprises a frequency domain window stage.

6. The receiver of claim 5, further comprising a decision feedback equalizer in said second data path having an input receiving an output from said frequency domain window stage, said decision feedback equalizer being provided for cancelling inter-bin interference created by the frequency domain window stage; an output of said decision feedback equalizer being provided to said logic stage.

7. The receiver of claim 6, further wherein the decision feedback equalizer has a further input from said first stage.

8. The receiver of claim 7, wherein a feedback signal is provided from an output of said logic stage to said decision feedback equalizer to cancel inter-bin interference created by said frequency domain window stage.

9. The receiver of claim 8, wherein the logic stage provides an output to a slicer stage, the slicer stage providing said demodulated digital bit stream as the demodulated output, said feedback signal comprising the demodulated output.

10. The receiver of claim 5, wherein said frequency domain window stage has an input coupled to an output of said first stage.

11. The receiver of claim 5, wherein the frequency domain window stage performs frequency domain pulse shaping on a bin-by-bin basis by performing a linear combination of bin outputs and frequency domain window coefficients defining a frequency domain window function of the frequency domain window stage.

12. The receiver of claim 5, wherein the window stage has an input from an output of the frequency domain equalizer.

13. The receiver of claim 1, wherein the logic stage selects an output from the first data path or the second data path based on the predefined tests for determining which data path provides more bits per symbol or has a higher signal to noise ratio.

14. The receiver of claim 13, wherein if a tie occurs, the logic stage selects the first data path.

15. The receiver of claim 1, wherein the window stage comprises one of a Hanning window function, a rectangular window function, a Discrete Prolate Spheriodal (DPS) window function, a Bartlett window function and a window function having a finite number of frequency domain coefficients.

16. The receiver of claim 1, wherein the frequency domain equalizer comprises a one-tap per-bin equalizer.

17. The receiver of claim 1, further comprising a time domain equalizer having as an input the input signal received from the communication channel, the time domain equalizer having an output provided to the first and second data paths.

18. A receiver providing a demodulated including a demodulated digital bit stream output from a received discrete multi-tone modulated input signal, the input signal received from a communication channel having noise thereon, the input signal having modulated thereon a digital bit stream, the receiver comprising:

first and second data paths coupled to receive the input signal:

the first of the two data paths comprising a first stage having a frequency response for applying a discrete Fourier Transform to the input signal and further comprising a frequency domain equalizer having an input coupled to an output of the first stage;

the second of the two data paths comprising a window stage for suppressing side lobes of the input signal; and a logic stage for selecting an output from the first data path or the second data path based on a predefined test and for providing a selected output representing the demodulated digital bit stream;

wherein the window stage in said second path comprises a time domain window stage.

19. The receiver of claim 18, wherein said time domain window stage has an input directly from a time domain equalizer.

20. The receiver of claim 19, further comprising a second stage for performing a discrete Fourier transform in said second data path, the second stage having an input receiving an output from said time domain window stage.

21. The receiver of claim 20, further comprising a decision feedback equalizer in said second data path having an input from said second stage and having an output provided to said logic stage.

22. The receiver of claim 21, wherein the decision feedback equalizer receives a further input from said first stage.

23. The receiver of claim 18, wherein the time domain window stage performs time domain pulse shaping by a sample-by-sample multiplication of the output from a time domain equalizer by window coefficients defining a time domain window function of the time domain window stage.

24. A method of providing a demodulated output including a demodulated digital bit stream from a received discrete multi-tone modulated input signal, the input signal received from a communication channel having noise therein, the input signal having modulated thereon a digital bit stream, the method comprising the steps of:

providing the input signal to first and second data paths;

applying a discrete Fourier Transform to the input signal in the first data path to generate a first transformed signal and frequency domain equalizing the first transformed signal to provide a frequency domain equalized signal;

suppressing side lobes of the frequency response of the first transformed signal by applying a window function in the second data path to provide a pulse shaped signal; and selecting an output from the first data path or the second data path based on a predefined test and providing a selected output representing the demodulated digital bit stream.

25. The method of claim 24, further comprising the step of performing decision feedback equalizing in said second data path on said pulse shaped signal for cancelling inter-bin interference created by said window function.

26. The method of claim 25, further comprising during the step of decision feedback equalizing, the step of providing a feedback signal comprising the elected output to cancel the inter-bin interference.

27. The method of claim 26, further comprising the step of slicing the selected output and providing a sliced output as the demodulated digital bit stream; said demodulated digital bit stream being provided as the feedback signal.

28. The method of claim 24, wherein said step of applying a window function in the second data path further comprises the step of applying a frequency domain window function.

29. The method of claim 28, further comprising the step of performing decision feedback equalizing in said second data path on said pulse shaped signal, said step of performing decision feedback equalizing being provided for cancelling inter-bin interference created by the frequency domain window function; and providing a decision feedback equalized signal for the step of selecting an output signal.

30. The method of claim 29, further comprising using the frequency domain equalized signal during said step of performing decision feedback equalizing.

31. The method of claim 30, further comprising providing a feedback signal during said step of performing decision feedback equalizing to cancel inter-bin interference created by said frequency domain window function.

32. The method of claim 31, further comprising the step of slicing the selected output into demodulated digital bit stream, said feedback signal comprising said demodulated digital bit stream.

33. The method of claim 28, further comprising applying the frequency domain window function to said first transformed signal.

34. The method of claim 28, wherein the step of applying a frequency domain window function comprises frequency domain pulse shaping on a bin-by-bin basis by performing a linear combination of bin outputs and frequency domain window coefficients defining the frequency domain window function.

35. The method of claim 28 further comprising applying the window function to the frequency domain equalized signal.

36. The method of claim 24, wherein the step of selecting an output from the first data path or the second data path comprises selecting the output based on the predefined test for determining which data path provides more bits per symbol or has a higher signal to noise ratio.

37. The method of claim 36, wherein if a tie occurs, the step of selecting an output comprises the step of selecting the first data path.

38. The method of claim 24, wherein the window function comprises one of a Hanning window function, a rectangular window function, Discrete Prolot Spheroid (DPS) window function, a Bartlett window function and a window function having a finite number of frequency domain coefficients.

39. The method of claim 24, wherein the step of frequency domain equalizing comprises frequency domain equalizing using a one-tap per-bin equalizer.

40. The method of claim 24, further comprising time domain equalizing the input signal received from the communication channel to produce a time domain equalized signal, and providing the time domain equalized signal to the first and second data paths.

41. A method of providing a demodulated output including a demodulated digital bit stream from a received discrete multi-tone modulated input signal, the input signal received from a communication channel having noise therein, the input signal having modulated thereon a digital bit stream, the method comprising the steps of:

providing the input signal to first and second data paths;

applying a discrete Fourier Transform to the input signal in the first data path to generate a first transformed signal and frequency domain equalizing the first transformed signal to provide a frequency domain equalized signal;

suppressing side lobes of the input signal by applying a window function in the second data path to provide a pulse shaped signal; and selecting an output from the first data path or the second data path based on a predefined test and providing a selected output representing the demodulated digital bit stream;

wherein the step of suppressing side lobes by applying a window function in said second path further comprises the step of applying a time domain window function.

42. The method of claim 41, wherein said step of applying a time domain window function comprises applying a time domain window function directly to said input signal.

43. The method of claim 42, further comprising performing a discrete Fourier transform in said second path to provide a second transformed signal, after said step of applying a time domain window function.

44. The method of claim 43, further comprising the step of performing decision feedback equalizing in said second data path on said second transformed signal.

45. The method of claim 44, further comprising using said first transformed signal during the step of decision feedback equalizing.

46. The method of claim 41, wherein said step of applying a time domain window function comprises time domain pulse shaping by a sample-by-sample multiplication of a time domain equalized signal by window coefficients defining the time domain window function.

* * * * *